United States Patent
Barthel et al.

(10) Patent No.: US 6,800,413 B2
(45) Date of Patent: Oct. 5, 2004

(54) LOW-SILANOL SILICA

(75) Inventors: Herbert Barthel, Emmerting (DE);
Mario Heinemann, Burghausen (DE);
Franz Grünwald, Haiming (DE);
Helmut Maginot, Burghausen (DE);
Ute Völkel, Burghausen (DE)

(73) Assignee: Wacker-Chemie GmbH, Munich (DE)

( * ) Notice: Subject to any disclaimer, the term of this patent is extended or adjusted under 35 U.S.C. 154(b) by 87 days.

(21) Appl. No.: 10/237,712

(22) Filed: Sep. 9, 2002

(65) Prior Publication Data

US 2003/0138715 A1 Jul. 24, 2003

(30) Foreign Application Priority Data

Sep. 13, 2001 (DE) .......................... 101 45 162

(51) Int. Cl.[7] .......................... G03G 9/00; C01B 33/12; C01F 7/02; C01G 23/047
(52) U.S. Cl. .............. 430/108.3; 430/108.7; 423/335; 423/336
(58) Field of Search .......................... 430/108.3, 108.7; 423/335, 336

(56) References Cited

U.S. PATENT DOCUMENTS

| | | |
|---|---|---|
| 3,953,487 A | 4/1976 | Kratel et al. |
| 4,307,023 A | 12/1981 | Ettlinger et al. |
| 5,153,030 A | 10/1992 | Chatfield et al. |
| 5,686,054 A | 11/1997 | Barthel et al. |
| 5,973,057 A | 10/1999 | Schoeley et al. |
| 6,183,867 B1 | 2/2001 | Barthel et al. |

FOREIGN PATENT DOCUMENTS

| | | |
|---|---|---|
| DE | 23 44 388 | 3/1975 |
| DE | 22 11 377 | 8/1977 |
| DE | 39 38 373 A1 | 5/1990 |
| DE | 196 01 415 A1 | 8/1996 |
| DE | 197 56 831 A1 | 7/1999 |
| EP | 0 579 049 B1 | 7/1995 |
| EP | 0 686 676 A1 | 12/1995 |
| EP | 0 924 267 A1 | 6/1999 |
| EP | 0 926 210 A1 | 6/1999 |
| WO | WO 99/36356 | 7/1999 |

OTHER PUBLICATIONS

English Derwent Abstract AN 1999–460396 [39] Corresponding To DE 197 56 831 A1.
English Derwent Abstract AN 1996–3560034 [36] Corresponding To DE 196 01 415 A1.
English Derwent Abstract AN 1975–17818W [11] Corresponding To DE 23 44 388.
English Derwent Abstract AN 1973–56596U [39] Corresponding To 22 11 377 C3.
English Derwent Abstract AN 1994–008697 [02] Corresponding To EP 0 579 049 B1.
The Sears method of acid–based titration is described in G.W. Sears, Analyt. Chem., 28(12), (1956), 1981.

Primary Examiner—Mark A. Chapman
(74) Attorney, Agent, or Firm—Brooks Kushman P.C.

(57) ABSTRACT

A silylated silica having an SiOH density per $nm^2$ of less than 0.6, based on the BET-method surface area (DIN 66131 and 66132), is prepared by silylating silica in a process where loading, reacting, and purifying are performed in separate steps.

27 Claims, No Drawings

LOW-SILANOL SILICA

BACKGROUND OF THE INVENTION

1. Field of the Invention

The invention relates to a silylated silica and to processes for preparing this silica.

2. Background Art

Silylated silicas having a residual silanol content of more than 25% of the silanol group content of the parent silica, corresponding to an SiOH density per $nm^2$ of more than 0.6 based on the BET-method surface area (DIN 66131 and 66132), have numerous disadvantages. The high residual silanol content leads to strong interactions between the silica particles through hydrogen bonds between the silanol groups and the silica surface, and hence to a severe thickening effect which is disrupted in processing, particularly when attempting to attain high filler levels in polymer and resin systems.

In powder systems, a residual silanol content above 25% leads to particle interactions and hence reagglomeration and separation. This has adverse effects on the flow-behavior stability and triboelectric stability properties of powder systems such as powder resins and toners on storage.

Existing processes for coating silica with organosilicon compounds, in accordance with the prior art, are based on the addition of silylating agents. A precondition for this treatment is the use of silylating agents which possess sufficient reactivity, for example silylating agents which bear reactive halide radicals (Cl, Br), alkoxy radicals (OR), amino radicals (—N—R), or silazane radicals (—N—Si—). Under industrial conditions, to accelerate the reaction and hence improve economy, it is common to add protic solvents, such as water. However, this process may lead to side reactions culminating in the formation of stable siloxane bonds (Si—O—Si), which are of little or no reactivity under the reaction conditions of the prior art, and which are therefore no longer available under industrial silylating conditions. Ultimately, this leads to a lower degree of silylation than intended, and to a lower reaction yield than expected.

Existing processes for preparing pyrogenic silica from organosilicon compounds are based on the use of a pyrogenic silica raw material, for example, in accordance with EP 0 855 368 A1 and the literature cited therein, wherein silica is freed of adhering hydrogen chloride by further addition of water or steam. According to the prior art, the further treatment with water results in improved silica purification but also, at the same time, in an increased surface density of hydroxyl groups attached to surface silicon atoms (silanol groups). Normally, this increased surface silanol group density is correlated with an increased reactivity of the pyrogenic silica thus treated.

It has now been surprisingly discovered that increased silanol group density on hydrophilic parent silica is disruptive to the achievement of a high degree of silylation, i.e., a high degree of coverage with silylating agent and a high yield in the reaction of the surface silanol groups with silylating agent radicals. The yield is desirably more than 75%, corresponding to a residual silanol content of less than 25%.

To attempt to overcome the inadequate reaction of the silanol groups and thus a deficient reaction yield by using a large excess of silylating agent to attain the target degree of silylation is economically unattractive. The high levels of hydrophobicizing agent that are needed for high degrees of hydrophobicization produce a high organosilicon waste load, which must be disposed of at great expense.

EP 579 049 discloses the addition of alcohols as a catalyst for the purpose of improving the reaction yield. This has the disadvantage, however, that the alcohol must subsequently be disposed of as an organic load on waste treatment facilities, and additionally, may create emissions to air and water.

From DE 02211377 and DE 2344388 it is known to silylate silica under mechanical load. In the processes described therein, however, residual silanol contents of less than 25% are not obtained.

Another disadvantage of silicas with high residual silanol content arises when they are used as an active filler in liquid systems, polymer systems, and resin systems of moderate and high polarity. In such systems, problems of miscibility and compatibility arise. This is particularly disadvantageous when close integration between the silica and the surrounding matrix is required in order to obtain good mechanical properties such as hardness, strength, toughness, and abrasion resistance, etc.

Another disadvantage displayed by such silica arises when used as additives, e.g., as antiblocking agents, as free-flow aids, or for controlling or regulating triboelectric properties of solids, especially with finely divided solids such as crosslinked polymer systems and resin systems or finely divided inorganic solids. Problems of miscibility and compatibility result, leading to separation of the silica when used as a free-flow aid and/or charge regulator in pulverulent products such as powder resin systems, powder coatings, and in toners and developers. This separation is associated with poor silica-powder particle interaction. The consequences of this separation include the destabilization and poor service life of the system, i.e., in the case of toner-silica mixtures, for example, poor stability on exposure to repeated copying and activating processes.

It would be desirable to overcome the disadvantages of the prior art, and to provide silica with a low concentration of surface silanol groups.

SUMMARY OF THE INVENTION

The present invention provides a process for the economical preparation of low surface silanol-content silicas by a multistage procedure, wherein in separate steps, a hydrophilic silica is first provided; the hydrophilic silica is loaded with silylating agent; the silica is then reacted with the silylating agent; and the silylated silica is then purified.

DETAILED DESCRIPTION OF THE PREFERRED EMBODIMENTS

The invention thus firstly provides a silylated silica having an SiOH density per $nm^2$ of less than 0.6, based on the BET-method surface area (DIN 66131 and 66132). These are silicas having a residual silanol group content of less than 25%, preferably less than 15%, and with particular preference less than 10%, of that of the parent silica. Particular preference is given to silylated silica of this kind with a residual silanol group content of less than 8%, and especially with a residual silanol group content of less than 5% that of the parent silica. The residual silanol group content is determined by the Sears method of acid-based titration, in a solvent mixture of methanol (50% by volume) and saturated aqueous sodium chloride solution (50% by volume) in deionized water (G. W. Sears, Anal. Chem., 28(12), (1956), 1981).

The invention further provides a process for preparing a silylated silica in separate, successive steps which each preferably take place in a separate vessel: (A) first, preparation of the hydrophilic parent silica, then (B) silylation of the silica by (1) loading of the hydrophilic silica with a silylating agent, (2) reaction of the hydrophilic silica with the silylating agent, and (3) purification of the hydrophilic silica to remove silylating agent and products of side reaction.

Parent Silica

The base (parent) silica for the silylation is a hydrophilic pyrogenic silica which is prepared under substantially anhydrous conditions. By anhydrous in this context is meant that neither in the hydrothermal preparation process nor in the further steps of the process, such as cooling, purifying, and storage, continuing to the ready-prepared and purified, packaged and ready-to-dispatch product, is substantial additional water supplied to the process, in either liquid or vapor form. In any case, no more than 10% by weight of water, based upon the total weight of the silica, is added; preferably, not more than 5% by weight, more preferably not more than 2.5% by weight, and with particular preference, no water at all is added.

It is preferred to use a silica of increased surface activity, which can be described in terms of increased surface homogeneity, characterized as minimal surface roughness at the molecular level.

The silica preferably has an average primary particle size of less than 100 nm, more preferably an average primary particle size of from 5 to 50 nm. These primary particles are not generally present in isolation in the silica, but instead are constituents of larger aggregates and agglomerates. The silica comprises aggregates (defined as per DIN 53206) in the range of diameters from 100 to 1000 nm, with the silica having agglomerates (defined as per DIN 53206) which are built up of aggregates and which depending on the external shearing load (e.g., measuring conditions) have sizes of from 1 to 500 μm.

The silica preferably has a fractal surface dimension of less than or equal to 2.3, more preferably less than or equal to 2.1, with particular preference from 1.95 to 2.05, the fractal surface dimension $D_s$ being defined here as follows: particle surface area A is proportional to particle radius R to the power of $D_s$. The silica preferably has a fractal mass dimension, $D_m$, of less than or equal to 2.8, preferably less than or equal to 2.7, with particular preference from 2.4 to 2.6. The fractal mass dimension $D_m$ is defined here as follows: particle mass M is proportional to particle radius R to the power of $D_m$. Both fractal surface dimension and fractal mass dimension are well known to the skilled artisan.

The silica preferably has a specific surface area of from 25 to 500 $m^2/g$ (measured by the BET method in accordance with DIN 66131 and 66132).

Preferably, the silica has a surface silanol group (SiOH) density of less than 2.5 $SiOH/nm^2$, more preferably less than 2.1 $SiOH/nm^2$, yet more preferably less than 2 $SiOH/nm^2$, and most preferably from 1.7 to 1.9 $SiOH/nm^2$.

Silicas prepared at high temperature (>1000° C.) can be used. Silicas prepared pyrogenically are particularly preferred. It is possible to use hydrophilic silicas which come freshly prepared direct from the burner, which have been stored, or which have already been packaged in the commercially customary fashion. Use may also be made of hydrophobicized silicas, examples being the commercially customary varieties of silica. Uncompacted silicas, with bulk densities <60 g/l, and also compacted silicas, with bulk densities >60 g/l, can be used. Mixtures of different silicas can be used: for example, mixtures of silicas with different BET surface areas, or mixtures of silicas differing in their degree of hydrophobicization or silylation.

Silylating Agent

One embodiment of the subject invention for preparing a silica of the invention with a low silanol group content is a process, using as its parent silica the silica described above, which is silylated with a silylating agent (I) containing apolar groups, selected from among I a) organosilane(s) of the formula

where n=1, 2 or 3
or mixtures of these organosilanes, $R^1$ being a saturated or unsaturated (i.e. monounsaturated or polyunsaturated), monovalent, optionally halogenated hydrocarbon radical having from 1 to 18 carbon atoms, each $R^1$ being identical or different, and X is halogen, a nitrogen-containing radical, $OR^2$, $OCOR^2$, or $O(CH_2)_xOR^2$, where $R^2$ is hydrogen or a monovalent hydrocarbon radical having from 1 to 12 carbon atoms, and x is 1, 2 or 3, or I b) organosiloxane(s) composed of units of the formula
($R^1_3SiO_{1/2}$) and/or
($R^1_2SiO_{2/2}$) and/or
($R^1SiO_{3/2}$), $R^1$ being as defined above, and
the number of these units in each organosiloxane on average being at least 2, Ia and Ib capable of being used alone or in any desired mixtures. The organosiloxanes are preferably liquid at the loading temperature.

Among organosiloxanes having a viscosity of more than 1000 mPas, preference is given to those which can be dissolved in industrially manageable solvents, preferably solvents such as alcohols, i.e. methanol, ethanol, or isopropanol, ethers such as diethyl ether or tetrahydrofuran, siloxanes such as hexamethyldisiloxane, alkanes such as cyclohexane or n-octane, and araliphatics such as toluene or xylene, at a concentration >10% and a mixing viscosity of less than 1000 mPas at the loading temperature. Among organosiloxanes which are solid at the loading temperature, preference is given to those which can be dissolved in an industrially manageable solvent (as defined above) at a concentration of more than 10% and a mixing viscosity of less than 1000 mPas at the loading temperature.

Examples of $R^1$ are alkyl radicals such as the methyl radical, the ethyl radical, propyl radicals such as the iso- and the n-propyl radicals, butyl radicals such as the t- and n-butyl radicals, pentyl radicals such as the neo-pentyl radical, the iso-pentyl radicals and the n-pentyl radical, hexyl radicals such as the n-hexyl radical, heptyl radicals such as the n-heptyl radical, octyl radicals such as the 2-ethylhexyl and the n-octyl radical, decyl radicals such as the n-decyl radical, dodecyl radicals such as the n-dodecyl radical, hexadecyl radicals such as the n-hexadecyl radical, octadecyl radicals such as the n-octadecyl radical, alkenyl radicals such as the vinyl, the 2-allyl and the 5-hexenyl radical, aryl radicals such as the phenyl, the biphenylyl or naphthenyl radical, alkylaryl radicals such as benzyl, ethylphenyl, tolyl and the xylyl radicals, halogenated alkyl radicals such as the 3-chloropropyl, the 3,3,3-trifluoropropyl and the perfluorohexylethyl radicals, and halogenated aryl radicals such as the chlorophenyl and chlorobenzyl radicals.

Preferred examples of $R^1$ are the methyl radical, the octyl radical, and the vinyl radical, the methyl radical being particularly preferred.

Examples of $R^2$ are alkyl radicals such as the methyl radical, the ethyl radical, propyl radicals such as the iso- and the n-propyl radical, butyl radicals such as the t- and n-butyl radical, pentyl radicals such as the neo-pentyl radical, the iso-pentyl radical and the n-pentyl radical, hexyl radicals such as the n-hexyl radical, heptyl radicals such as the n-heptyl radical, octyl radicals such as the 2-ethylhexyl and the n-octyl radical, decyl radicals such as the n-decyl radical, and dodecyl radicals such as the n-dodecyl radical. Preferred examples of $R^2$ are the methyl and ethyl radicals.

Examples of organosilanes suitable for use in the subject invention process include methyltrichlorosilane, dimethyldichlorosilane, trimethylchlorosilane, methyltrimethoxysilane, dimethyldimethoxysilane, trimethylmethoxysilane, methyltriethoxysilane, dimethyldiethoxysilane, trimethylethoxysilane, methyltriacetoxysilane, dimethyldiacetoxysilane, trimethylacetoxysilane, octylmethyldichlorosilane, octyltrichlorosilane, octadecylmethyldichlorosilane, octadecyltrichlorosilane, vinyltrichlorosilane, vinylmethyldichlorosilane, vinyldimethylchlorosilane, vinyltrimethoxysilane, vinylmethyldimethoxysilane, vinyldimethylmethoxysilane, vinyltriethoxysilane, vinylmethyldiethoxysilane, vinyldimethylethoxysilane, hexamethyldisilazane, divinyltetramethyldisilazane, bis(3,3-trifluoropropyl)tetramethyldisilazane, octamethylcyclotetrasilazane, and trimethylsilanol. It is also possible to use any desired mixtures of organosilanes. Mixtures of methylchlorosilanes on the one hand, or alkoxysilanes and optionally disilazanes on the other hand, are preferred. Preference is given to methyltrichlorosilane, dimethyldichlorosilane and trimethylchlorosilane or hexamethyldisilazane.

Examples of organosiloxanes are linear or cyclic dialkylsiloxanes having an average number of dialkylsiloxy units of more than 3. The dialkylsiloxanes are preferably dimethylsiloxanes. Particular preference is given to linear polydimethylsiloxanes having the following end groups: trimethylsiloxy, dimethylhydroxysiloxy, dimethylchlorosiloxy, methyldichlorosiloxy, dimethylmethoxysiloxy, methyldimethoxysiloxy, dimethylethoxysiloxy, methyldiethoxysiloxy, dimethylacetoxysiloxy, methyldiacetoxysiloxy, and dimethylhydroxysiloxy, it being possible for the end groups to be identical or different. Among the polydimethylsiloxanes mentioned, particular preference is given to those having a viscosity at 25° C. of from 2 to 100 mPas and containing trimethylsiloxy or dimethylhydroxysiloxy end groups.

Further examples of organosiloxanes are liquid or soluble silicone resins, especially those containing methyl groups as the alkyl group. Particular preference is given to those containing $R^1{}_3SiO_{1/2}$ and $SiO_{4/2}$ units or to those containing $R^1SiO_{3/2}$ and optionally $R^1{}_2SiO_{2/2}$ units. $R^1$ therein is preferably methyl.

Silylating Process (B)

Preparation of the homogeneously silylated silica of the invention with low silanol group content preferably takes place as follows.

The preparation (A) of the hydrophilic silica preferably takes place in accordance with known techniques for preparing pyrogenic silica at high temperature by reacting a silane in a hydrogen-oxygen flame at temperatures of 1000–1500° C. The silane used is preferably tetrachlorosilane, methyltrichlorosilane, hydrotrichlorosilane, hydromethyldichlorosilane, tetramethoxysilane, tetraethoxysilane, hexamethyldisiloxane, or mixtures thereof. Tetrachlorosilane is particularly preferred. Following reaction, the silica is separated from the process gas, preferably by way of filters, and then purified to remove residual hydrogen chloride gas, preferably in a hot gas stream, preferred gases being air or oxygen, at temperatures of preferably greater than 250° C.–500° C., more preferably 250° C.–350° C., and with particular preference 350° C.–400° C. In any case, no more than 10% by weight of water, based on the total weight of the silica, is added; preferably, not more than 5% by weight, more preferably not more than 2.5% by weight, and with particular preference no water at all, is added.

The surface treatment or silylation (B) of the silica takes place in 3 steps, namely (1) loading, (2) reaction, and (3) purification.

The surface treatment is preferably conducted in an atmosphere which does not lead to the oxidation of the silylated silica, i.e., which contains preferably less than 10% by volume of oxygen, with particular preference less than 2.5% by volume. Best results are achieved at less than 1% by volume oxygen.

Loading (1), reaction (2), and purification (3) may be conducted as a batchwise or continuous process. For technical reasons, a continuous reaction regime is preferred.

In a further particularly preferred embodiment, no separate conveying step for transporting the silica is required between the separate processes of charging and reacting; conveying may take place by gravitation, for example by gravity-induced drop. The separation between charging and reaction can be realized by means of a suitable mechanical separating system, such as a single or double flap or by appropriately configured sluice systems, such as cellular wheel sluices. In another embodiment, the separation can be realized by means of a tapering in the vessel cross section by a factor of more than 2, or by means of a pipeline, this junction preferably being kept free from clogging by means of stirring elements. The procedure has the advantage that the silica, in the state of initially physical loading with silylating agent, always remains in very close contact with the silylating agent up to the time where fixing of the silylating agent on the silica is complete.

In a further particularly preferred embodiment, no separate conveying step for transporting the silica is required between the separate steps of reaction and of purification; conveying preferably takes place gravitationally, by gravity-induced drop. The separation between reaction and purification can also be realized by means of a suitable mechanical separating system, such as a single or double flap or appropriately configured sluice systems, such as cellular wheel sluices.

(1) Loading

Loading takes place at temperatures of −30–250° C., preferably 20–150° C., with particular preference to the range of 20–50° C. Preferably, the loading step is cooled to provide a temperature of 30–50° C. The residence time in the loading step is 1 min-24 h, preferably from 15 min to 240 min, and, for reasons of space-time yield, with particular preference from 15 min to 90 min. The pressure ranges from a slight underpressure to 0.2 bar to an overpressure of 100 bar, with preference being given for technical reasons to normal pressure, in other words to working free of any pressure different from external/atmospheric pressure.

The silylating agents are preferably added in liquid form. Preferably, the silylating agents are mixed into the pulverulent silica. This is preferably done by means of nozzle techniques, or comparable effective atomizing techniques, for example atomizing in 1-fluid nozzles under pressure (preferably from 5 to 20 bar), spraying from 2-fluid nozzles under pressure (preferably gas and liquid 2–20 bar), ultrafine distribution with atomizers or gas-solid exchange units with moving, rotary or static internals, or other techniques which permit homogeneous distribution of the liquid silylating agents with the pulverulent silica. The silylating agent is added preferably in the form of a very finely divided aerosol which has a settling velocity of 0.1–20 cm/s.

Charging of the silica and reaction with the silylating agent preferably take place with mechanical or gasborne fluidization. Mechanical fluidization is particularly preferred.

Gasborne fluidization may take place by means of any inert gases which do not react with the silylating agent, the silica, the silylated silica, or products of side reactions, i.e., which do not lead to side reactions, degradation reactions, oxidation events or flame and/or explosion phenomena. Examples include $N_2$, Ar, other noble gases, $CO_2$, etc. The fluidizing gases are preferably supplied at superficial gas velocities in the range from 0.05 to 5 cm/s, with particular preference to the range of 0.5–2.5 cm/s.

Particular preference is given to mechanical fluidization, which takes place without additional use of gas beyond that required for inertization, for example by means of paddle stirrers, anchor stirrers, and other suitable stirring elements. In one particularly preferred embodiment, the unreacted silylating agents, products of side reactions, excesses of silylating agents which have not been fixed chemically and which may have been changed, purification offproducts, and offgases from the purification step are recycled to the step of coating and charging of the silica. This recycle may take place completely or partially, preferably to the extent of 10–90% of the entire volume flow of the gas volumes emerging from the purification, in suitable heat-conditioned apparatus.

Recycling preferably takes place in the noncondensed phase, in other words, as a gas or as a vapor. The recycling may take the form of mass transport along a pressure equalization or of controlled mass transport with gas transport systems that are customary in industry, such as fans and pumps, including compressed air diaphragm pumps. Since the recycling of the noncondensed phase is preferred, it may be advisable to heat the recycle lines. The extent of recycling of the reaction offproducts and reaction side products can be between 5 and 100% by weight, based on their total mass, preferably between 30 and 80% by weight. Based on 100 parts of fresh silylating agent, the recycling may amount to between 1 and 200 parts, preferably from 10 to 30 parts.

The offproducts and reaction side products of purification may be neutral, acidic or basic. In one embodiment these purification offproducts and reaction side products can be neutral and may represent reactive organosilicon compounds. In another embodiment, the purification offproducts and reaction side products may be basic in nature, in the manner of a Brönsted or Lewis base. In a yet further embodiment, the purification offproducts and reaction side products may be acidic in nature, in the manner of a Brönsted or Lewis acid. Preferably, the recycling of the reaction side products and purification offproducts to the coating stage takes place continuously.

(2) Reacting

The reaction of the silylating agent with silica takes place preferably at temperatures 40–400° C., more preferably 80–160° C., and with particular preference 80–120° C. The reaction time is from 5 min to 48 h, preferably from 10 min to 4 h. Optionally, protic solvents may be added, such as liquid or volatile alcohols or water; typical alcohols are isopropanol, ethanol, and methanol. Mixtures of the above-mentioned protic solvents may also be added. It is preferred to add from 1 to 50% by weight of protic solvent, relative to the silica, with particular preference from 5 to 25% by weight. Water is particularly preferred.

Optionally, it is possible to add acidic catalysts, of acidic nature in the manner of a Lewis acid or a Brönsted acid such as hydrogen chloride, or basic catalysts, of basic nature in the manner of a Lewis base or a Brönsted base such as ammonia. These are preferably added in traces, i.e., at less than 1000 ppm. With particular preference, no catalysts are added.

(3) Purifying

The purification of reaction side products is carried out at a purification temperature from 20° C. to 350° C., preferably from 50° C. to 200° C., with particular preference from 50° C. to 150° C. The purification step is preferably characterized by agitation, with slow agitation and gentle mixing being particularly preferred. The stirring elements are advantageously positioned and moved in such a way as to produce mixing and fluidizing, but not complete vortexing.

The purification step generally features increased introduction of gas, corresponding to a superficial gas velocity of from 0.001 to 10 cm/s, preferably from 0.01 to 1 cm/s, using any inert gases which do not react significantly with the silylating agent, the silica, the silylated silica, or reaction side products. In other words, the inert gases should not lead to secondary reactions, degradation reactions, oxidation events, or flame and explosion phenomena. Preferably $N_2$, Ar, other noble gases, $CO_2$, etc., are used as the inert gases.

Additionally, during the silylation or following the purification, continuous or batchwise processes for the mechanical compaction of the silica may be employed, such as, for example, press-rollers, grinding equipment such as edge-runner mills and ball mills, compaction by screws or screw mixers, screw compactors, briquetting units, or compaction by removal of air or gas under suction, i.e. by means of suitable vacuum methods.

Particular preference is given to mechanical compaction in the course of silylation, in step (II) of the reaction, by means of press-rollers, above-mentioned grinding equipment such as ball mills, or compaction by screws, screw mixers, screw compactors, or briquetting devices.

In a further particularly preferred procedure, processes for mechanical compaction of the silica are employed following purification, such as compaction by removal of the air or gas under suction, by means of appropriate vacuum methods. Additionally, in one particularly preferred procedure, processes for deagglomerating the silica are employed following purification, such as pin mills or devices for milling/classifying, such as pinned-disk mills, hammer mills, countercurrent mills, impact mills or milling/classifying devices.

Thus, in accordance with the subject invention, the steps of loading, reacting, and purifying are distinct steps which preferably although not necessarily, take place in different apparatus, or in a single apparatus where the three steps may preferably by conducted in at least partial isolation from the remaining steps, for example, but not limitation, by suitable means described previously. Thus, it is desired that little reaction of the silylating reagent with the silica take place in the loading step, and that reaction has been substantially completed by the start of the purification step.

Although, parameters including, inter alia, the temperature and gas flow ranges are disclosed to have overlapping ranges, the overlap is a consequence of the numerous types of silylating agents, base silica, and other process parameters which may be employed. Thus, for example, one silylating agent might require only 150° C. to react, while a less reactive silylating agent might require 300° C. With any given silylating agent or combination thereof, however, with a defined silica and in a defined process, i.e. batch or continuous, etc., the reaction temperature will always be higher than the loading temperature, minimally 10° C. higher, preferably at least 50° C. higher, and in many cases higher by 100° C. to 200° C. or more. The temperature differential between loading and reaction allows uniform loading to be accomplished without significant reaction at this stage.

The purification step follows the reaction step. At this time, the silylation reaction is substantially complete, and removal of excess silylating agent and various reaction products is the object. For this stage, the temperature is generally kept high, although it is not necessarily as high as the temperature of the reaction stage. However, the purification stage is distinguished from the reaction stage by a significantly higher gas flow, in order to remove impurities efficiently. This gas flow should preferably be higher by a factor of two or more from the gas flow during the loading and reaction steps, preferably four or more times higher. In many cases, very little if any gas flow will take place in the loading and reaction phases of the process, with only sufficient inert gas to "blanket" the process and to displace air, thus lowering the oxygen content.

The silylating agent is preferably used in an amount of more than 3% by weight, more preferably more than 10% by weight, of silylating agent, for a Silica surface of 100 m$^2$/g BET surface area (measured by the BET method in accordance with DIN 66131 and 66132).

In the silylation process, in one particularly preferred embodiment, a silylating agent having a boiling point >300° C. under atmospheric pressure and a silylating agent having a boiling point below 200° C. at atmospheric pressure are employed. In another preferred embodiment, at least two different silylating agents are employed with the proviso that at least one silylating agent has a viscosity of less than 2 mPas at 25° C. and at least one silylating agent has a viscosity of more than 5 mPas at 25° C.

In one particularly preferred embodiment, silylating agents in step (I) of loading are liquids, i.e., the loading temperature (I) is below the lowest of their boiling points. In a further particularly preferred embodiment, silylating agents in all three steps of the silylation, namely loading (I), reaction (II), and purification (III), are liquids.

The silylation can be carried out as a batchwise reaction or as a continuous reaction. For technical reasons, a continuous reaction is preferred.

Surprisingly it has now been found that the recycling of the reaction side products and purification offproducts of the silylating reaction to the step of loading contributes to solving the abovementioned problems and phenomena of the prior art.

It has likewise surprisingly been found that if there is no further conveying step for transporting the silica between the separate units of charging and of reaction and if conveying takes place gravimetrically, for example by means of gravity-induced drop, silylation is improved. The separation between charging and reaction can be realized under these conditions by means of a suitable mechanical separating system such as a single or double flap, or by a suitably configured sluice system such as a cellular wheel sluice. This procedure has the advantage that the silica, in the state of initially physical charging with silylating agent, always remains in very close contact with said agent, up to the time where fixing of the silylating agent on the silica is complete.

Higher reaction yields and heightened degrees of silylation are obtained by the process of the present invention. One object (1) of the invention is providing a silica of low silanol group content having a homogeneous coat of silyating agent, having an average primary particle size of less than 100 nm, preferably having an average primary particle size of from 5 to 50 nm, these primary particles generally not existing in isolation in the silica but instead being constituents of large aggregates (as defined in DIN 53206) which have a diameter of from 100 to 1000 nm and make up agglomerates (as defined in DIN 53206) which depending on the external shearing load have sizes of from 1 to 500 $\mu$m, the silica having a specific surface area of from 10 to 300 m$^2$/g (measured by the BET method to DIN 66131 and 66132), the silica having a fractal mass dimension $D_m$ of less than or equal to 2.8, preferably less than or equal to 2.7, with particular preference from 2.4 to 2.6, and a surface silanol group (SiOH) density of less than 0.6 SiOH/nm$^2$, preferably less than 0.25 SiOH/nm$^2$, with particular preference less than 0.15 SiOH/nm$^2$, and per 100 m$^2$/g specific surface (measured by the BET method to DIN 66131 and 66132), and a carbon content of at least 1.0% by weight, preferably greater than 1.5% by weight.

The silica of the invention with a low silanol group content and a homogeneous coat of silylating agent has an average primary particle size of less than 100 nm, preferably an average primary particle size of from 5 to 50 nm, these primary particles not existing in isolation in the silica but instead being constituents of larger aggregates (as defined in DIN 53206).

The silica with a homogeneous coat of silylating agent in particular has a specific surface area of more than 25 m$^2$/g (measured by the BET method to DIN 66131 and 66132).

The silica of the invention is preferably composed of aggregates (as defined in DIN 53206) with diameters in the range from 100 to 1000 nm, preferably from 100 to 500 nm, with particular preference from 100 to 250 nm.

The silica of the invention is preferably also composed of agglomerates (as defined in DIN 53206) which under shearing-free or low-shear measuring conditions have a size of from 1 $\mu$m to 500 $\mu$m, preferably from 1 $\mu$m to 50 $\mu$m.

The silica of the invention has, per 100 m$^2$/g of specific surface (measured by the BET method to DIN 66131 and 66132), a carbon content of at least 1.0% by weight, preferably greater than 1.5% by weight.

The silica of the invention has a fractal mass dimension $D_m$ of less than or equal to 2.8, preferably less than or equal to 2.7, with particular preference from 2.4 to 2.6.

The silica of the invention has a surface silanol group (SiOH) density of less than 0.6 SiOH/nm$^2$, preferably less than 0.25 SiOH/nm$^2$, with particular preference less than 0.15 SiOH/nm$^2$. On contact with water the silica has substantially no wettable fractions.

The silica displays apolarity, measured by adsorption of methyl red (see description of analytical methods below). On the basis of these characteristics, the silica of the invention can be referred to as being apolar. The silica displays an apolarity, measured by solvatochromism (with bisphenylenedicyanoiron(II) in dichloroethane) as dipolarity $\pi^*$, of less than 1.0. In accordance with these characteristics, the silica of the invention can also be referred to as being apolar.

Particular characteristics of the silica of the invention are that its surface is physicochemically homogeneous and that the residues of silylating agent and the residual, unreacted silanol groups are distributed with a homogeneous uniformity, even at the microscopic level. This can be demonstrated by means of adsorption measurements, such as static-volumetric gas adsorption or inverse gas chromatography.

In one preferred embodiment, the silica of the invention possesses a fully chemically bonded silylating agent coat (i.e., less than 5% by weight of the organosilicon silylating agent coat is extractable, with tetrahydrofuran at 25° C., detection of the organosilicon compounds extracted advantageously taking place by means of silicon-specific atomic absorption spectrometry).

The invention further provides crosslinkable polymer and/or resin compositions which comprise a silica of the invention. Further characteristics of the silica of the invention, for example, are that it exhibits a high thickening effect in polar systems, such as solvent-free crosslinkable polymers and/or resins, or such as solutions, suspensions, emulsions, and dispersions of organic resins in aqueous systems or organic solvents (e.g.: polyesters, vinyl esters, epoxy, polyurethane, alkyd resins, etc.), and is therefore suitable as a theological additive to these systems.

Further characteristics of the silica of the invention are that it has a low thickening effect in apolar systems such as uncrosslinked silicone rubber, but at the same time exhibits a high reinforcing effect in the crosslinked silicone rubbers, and is therefore outstandingly suitable for use as a reinforcing filler in the applications.

Further characteristics of the silica of the invention are that in pulverulent systems it prevents caking or clumping, under the influence of moisture, for example, but also does not tend toward reagglomeration, and hence toward unwanted separation, but instead keeps powders flowable and so permits load-stable and storage-stable mixtures of Silica powders. This applies in particular to its use in magnetic and nonmagnetic toners and developers, which may be 1-component or 2-component systems, for example in toners, developers, charge control agents, e.g., in contactless or electrophotographic printing/reproduction processes. This also applies to pulverulent resins which are used as coating systems.

The invention further provides a toner, developer, charge control agent, e.g., in contactless or electrophotographic printing/reproduction processes, which comprises a homogeneously silylated silica having a low silanol group content.

The invention relates generally to the use of the silica of the invention in all solvent-free, solventborne, water-thinnable, film-forming coating compositions, rubberlike to hard coatings, adhesives, sealants and casting compositions, and other, comparable systems. It relates to all systems of low to high polarity which comprise silica as viscosity-imparting component. It relates in particular to systems such as:

1. epoxy systems
2. polyurethane (PU) systems
3. vinyl ester resins
4. unsaturated polyester resins
5. water-soluble and water-dispersible resin systems
6. low-solvent resin systems, called high solids
7. solvent-free resins applied in powder form as, for example, coating materials.

In these systems, as a Theological additive, the silica of the invention provides the required viscosity, pseudoplasticity, thixotropy, and a yield point which is sufficient for the ability to stand on vertical faces.

The invention relates to the use of the Silica of the invention as a Theological additive and reinforcing filler in crosslinked and uncrosslinked silicone systems such as silicone elastomers, which are composed of silicone polymers such as polydimethylsiloxanes, fillers, and further additives. These systems may, for example, be crosslinked with peroxides, or by way of addition reactions i.e. the so-called hydrosilylating reaction between olefinic groups and Si—H groups, or by way of condensation reactions between silanol groups, e.g., those which come about on exposure to water.

The invention relates additionally to the use of the homogeneously silylated silica of the invention in developers and toners, e.g., magnetic and nonmagnetic toners, which may be 1-component or 2-component systems. These toners may be composed of resins, such as styrene resins and acrylic resins, and mixtures thereof, or polyester resins and epoxy resins, and mixtures thereof, and may have been ground preferably to particle distributions of 1–100 $\mu$m, or may be resins which have been prepared in polymerization processes in dispersion or emulsion or solution or in bulk to particle distributions of preferably 1–100 $\mu$m. The silica is preferably used for improving and controlling the flow properties of powder and/or for regulating and controlling the triboelectric charging properties of the toner or developer. Toners and developers of this kind can be used with preference in electrophotographic printing processes, and can also be used in direct image transfer processes. The same is true in pulverulent resins which are used as coating systems.

A toner typically has the following composition: a solid resin binder which is sufficiently hard to produce a powder therefrom, preferably having a molecular weight of more than 10,000, and preferably with less than 10% of a polymer fraction having a molecular weight of below 10,000, e.g., a polyester resin, which may be a cocondensate of diol and carboxylic acid, carboxylic ester or carboxylic anhydride, e.g., with an acid number of 1–1000, preferably 5–200, or a polyacrylate or a polystyrene, or mixtures, or copolymers thereof, having an average particle diameter of less than 20 $\mu$m, preferably less than 15 $\mu$m, most preferably less than 10 $\mu$m. The toner resin may comprise alcohols, carboxylic acids, and polycarboxylic acid. Colorants which are customary in the art, such as black carbon black, pigment-grade carbon black, cyan dyes, magenta dyes, yellow dyes are generally used.

Typically, negative charge control agents are employed, i.e. charge control additives such as metallic azo dyes, copper phthalocyanine dyes, or metal complexes, for example, alkylated salicylic acid derivatives or benzoic acid derivatives, especially derivatives with boron or aluminum, in the required amounts, typically less than 5% by weight.

Optionally, positive charge control agents are used, i.e. charge control additives of the nigrosine dye type, for example, or triphenylmethane dyes substituted by tertiary amines, or quaternary ammonium salts such as CTAB ("cetyltrimethylammonium bromide" or "hexadecyltrimethylammonium bromide"), or polyamines, typically at contents of less than 5% by weight.

If desired, for producing magnetic toners, magnetic powders may be added, including ferromagnetic powders which can be magnetized in a magnetic field such as iron, cobalt, nickel, alloys thereof, or compounds such as magnetite, hematite or ferrite. Optionally it is also possible to add developers such as iron powders, glass powders, nickel powders, and/or ferrite powders.

The compositions include silica of the present invention in amounts, based on a solid resin binder with an average particle diameter of 20 μm, of more than 0.01% by weight, preferably more than 0.1% by weight. As the average particle diameter of the binder goes down, it is generally necessary to have higher silica contents, the required amount of silica increasing in inverse proportion to the particle diameter of the binder. Preferably, however, in any case the amount of silica is less than 5% by weight based on binder resin.

Further inorganic additives may also be included, such as finely divided and coarse silicon dioxides, including those with an average diameter of from 100 to 1000 nm, aluminum oxides such as pyrogenic aluminas, titanium dioxides such as pyrogenic or anatase or rutile, and/or zirconium oxides.

Waxes may also be included, such as paraffinic waxes having 10–500 carbon atoms, silicone waxes, olefinic waxes, waxes having an iodine number <50, preferably <25, and a hydrolysis number of 10–1000, preferably 25–300.

The toner can be used in different developing processes such as electrophotographic image generation and reproduction, including magnetic brush processes, cascade processes, use of conductive and nonconductive magnetic systems, powder cloud processes, developing in impression, and others.

Advantages of the subject process for preparing substantially apolar silica include:

high reaction yields—hence economical and sparing of resources high degree of silylation for minimal use of silylating agent high and homogeneous, uniform degree of silylation, even when silylating agents differing greatly in chemistry and physics are used possibility of carrying out silylation using organosilicon compounds which according to the prior art are considered slow to react (see gradation of the reactivity of the groups: Si—N>Si-Hal>Si—OH>SiOR>>Si—O—R, e.g., according to V. Tertykh) and which otherwise cannot be used for economic silylation silylation in the absence of catalysts, which for technical reasons often have to remain in the product but which could adversely affect the quality and performance of the end product improved image quality when using the toner prepared with the silica prolonged lifetime at high performance (e.g., image dot density) of the toner prepared with the silica.

The invention additionally provides a silylated silica of low silanol group content which contains homogeneously distributed polar surface groups. The base (parent) product for the silylation is a hydrophilic pyrogenic silica which is prepared under anhydrous conditions. By anhydrous in this context is meant that neither in the hydrothermal preparation process nor in the further steps of the process, such as cooling, purifying, and storage, right through to the ready-prepared and purified, packaged and ready-to-dispatch product, is substantial additional water supplied to the process, in either liquid or vapor form. In any case, no more than 10% by weight of water, based upon the total weight of the silica, is added; preferably, not more than 5% by weight, more preferably not more than 2.5% by weight, and with particular preference no water at all, is added.

It is preferred to use a silica of increased surface activity, which can be described as increased surface homogeneity, which can be characterized as minimal surface roughness at the molecular level.

The silica preferably has an average primary particle size of less than 100 nm, more preferably an average primary particle size of from 5 to 50 nm. These primary particles are not present in isolation in the silicas, but instead are constituents of larger aggregates and agglomerates.

The silica comprises aggregates (defined as per DIN 53206) in the region of diameters from 100 to 1000 nm, with the silica having agglomerates (defined as per DIN 53206) which are built up of aggregates and which depending on the external shearing load have sizes of from 1 to 500 μm.

The silica preferably has a fractal surface dimension of preferably less than or equal to 2.3, more preferably less than or equal to 2.1, with particular preference from 1.95 to 2.05, the fractal surface dimension $D_s$ being defined here as follows: particle surface area A is proportional to particle radius R to the power of $D_s$. The silica preferably has a fractal mass dimension, $D_m$, of preferably less than or equal to 2.8, preferably less than or equal to 2.7, with particular preference from 2.4 to 2.6. The fractal mass dimension $D_m$ is defined here as follows: particle mass M is proportional to particle radius R to the power of $D_m$.

The silica preferably has a specific surface area of from 25 to 500 $m^2/g$ (measured by the BET method in accordance with DIN 66131 and 66132).

Preferably, the silica has a surface silanol group (SiOH) density of less than 2.5 $SiOH/nm^2$, more preferably less than 2.1 $SiOH/nm^2$, yet more preferably less than 2 $SiOH/nm^2$, and most preferably from 1.7 to 1.9 $SiOH/nm^2$.

Silicas prepared at high temperature (>1000° C.) can be used. Silicas prepared pyrogenically are particularly preferred. It is also possible to use hydrophilic silicas which come freshly prepared direct from the burner, have been stored, or have already been packaged in the commercially customary fashion. Use may also be made of hydrophobicized silicas, examples being the commercially customary varieties. Uncompacted silicas, with bulk densities<60 g/l, and also compacted silicas, with bulk densities>60 g/l, can be used. Mixtures of different silicas can be used: for example, mixtures of silicas with different BET surface areas, or mixtures of silicas differing in their degree of hydrophobicization or silylation.

As a silylating agent for preparing the low-silanol silica having homogeneously distributed polar surface groups, use is made of a silylating agent containing polar and apolar groups. In this process, a silylating agent (I) containing apolar groups, has been previously described as containing organosilanes Ia) and/or organosiloxanes Ib).

The silylating agent II) containing polar groups comprises organosilanes IIa) and/or organosiloxanes IIb).

Organosilanes IIa) have the formula $$R^3{}_m R^1{}_n SiX_1$$

where m+n+1=4, n=0, 1 or 2, and m=1, 2 or 3 or mixtures of silanes or organosilanes where n=0 to 2 and m=1 to 3, preferably 1.

$R^3$ in the polar group-containing silanes denotes hydrogen or a monovalent or divalent hydrocarbon radical which has 1 to 12 carbon atoms, preferably 3 to 8 carbon atoms, and contains one or more identical or different heteroatoms Y. The hydrocarbon radical may be SiC bonded or Si—O—C bonded. Si—C bonded is preferred. Where the hydrocarbon radical is a divalent hydrocarbon radical, it may be bonded to 2 silicon atoms or may comprise an organosilane of the structure $X_{4-n-m}R^1{}_n SiR^3{}_m SiR^1{}_n X_{4-n-m}$.

The heteroatom Y is preferably an element from main groups 3, 4 (but not carbon), 5, and 6 of the periodic table of the elements. Preferred examples of Y are: N, P, O, and S.

Y is preferably present in C—Y structures.

Examples of C—Y structures are:

| | |
|---|---|
| Y=N: | C—NR$^4$$_2$ (amine), C—NR$^4$—Si≡ (amine), C=NR$^4$ (imine), C(O)—N—, CR$^4$=N—, C(OR$^4$)=N—, C≡N (nitrile), C≡N—O (cyanate), N=C=O (isocyanate), C=N—OH (hydroxylamine) |
| Y=P: | C—PR$^4$$_2$ (phosphine) C—P=O(—O—)$_2$ (phosphonates, their acid and their esters), C—P=O(—O—)—C (phosphinates, their acid and esters) |
| Y=O: | C—O—H (carbinol), C—O—C (ether), C=O (ketone, aldehyde), C(O)—O— (carboxylic acid (ester)), C(O)C= (epoxide ring) |
| Y=S: | C—S—H (mercaptan), C—S—C (sulfide), C—S$_X$—C (polysulfide where X = 2, 3, 4, 5, 6, 7 or 8), —C(S)—S— (thiocarboxylic acid), C—S(=O)—C (sulfoxide), C—S(=O)$_2$ (sulfone), C—S=O(—O—) (sulfinic acid (ester)), C—S=O(—O—)$_2$ (sulfonic acid (ester)), —N=C=S (isothiocyanate), —S—C≡N (thiocyanate). |

R$^4$ denotes hydrogen or a monovalent hydrocarbon radical having 1 to 12 carbon atoms.

Examples of monovalent nitrogen-containing radicals R$^3$ are N-aminoalkyl radicals, such as 3-aminopropyl radicals, it being possible for the aminopropyl radicals to be primary, secondary, and tertiary amino radicals. An example of a primary amino radical is the 3-aminopropyl radical. Examples of secondary amino radicals are the cyclohexyl-, ethyl- or methylaminopropyl radicals, and examples of tertiary amino radicals are the dimethyl- and the diethylaminopropyl radical. Examples of mixed primary, secondary, and tertiary amino radicals are the aminoethyl-3-aminopropyl radical and the diethylaminoethylaminopropyl radicals. Examples of further nitrogen-containing radicals are alkylimino radicals, alkylcyano radicals such as the 3-cyanopropyl radical, alkylamido radicals, alkylimido radicals, alkylhydroxylamino radicals, and alkyloximo radicals.

Examples of divalent nitrogen-containing radicals R$^3$ are N,N'-bis(n-alkyl)alkylenediamine radicals, such as the N,N'-bispropylethylenediamine radical.

Examples of divalent phosphorus-containing radicals R$^3$ are phosphinatoalkylsilyl radicals, such as, for example, the free acid or the sodium salt of the 2-phosphinatobis [ethyldimethylsilyl] radical (e.g., ≡Si—CH$_2$—CH$_2$—P(=O)(O$^-$Na$^+$)—CH$_2$—CH$_2$—Si≡). Examples of monovalent phosphorus-containing radicals R$^3$ are phosphonatoalkyl radicals.

Examples of monovalent oxygen-containing radicals R$^3$ are polyalkylene oxide (polyoxyalkylene) radicals and polyalkylene oxide-alkyl radicals, such as carbinol- and alkoxy-terminated polyalkylene oxide radicals and polyalkylene oxide alkyl radicals, such as carbinol- and alkoxy-terminated polyethylene oxide-alkyl radicals and polypropylene oxide-alkyl radicals, preferably having from 3 to 20 chain members, and also acryloyloxyalkyl radicals, alkylacryloyloxyalkyl radicals such as the 3-methacryloyloxypropyl radical, carbinol radicals, ether radicals such as alkyloxyalkyl radicals, glycidyloxyalkyl radicals such as the 3-glycidyloxypropyl radical, acid anhydride-alkyl radicals such as the succinic anhydride-propyl radical, and alkyl ester alkyl radicals such as the 3-acetoxypropyl radical.

Examples of monovalent sulfur-containing radicals R$^3$ are the mercaptoalkyl radicals such as the 3-mercaptopropyl radical and isothiocyanate radicals such as the 3-isothiocyanatopropyl radical.

Particular preference is given to the 3-aminoethylaminopropyl radical, the 3-aminopropyl radical, the 3-diethylaminopropyl radical, the sodium 2-phosphinatoethyl radical, the butoxy-terminated 3-polyethylene oxide-propyl radical having from 4 to 6 polyethylene oxide units, the 3-methacryloyloxypropyl radical, the isothiocyanatopropyl radical, the 3-mercaptopropyl radical, the isothiocyanatopropyl radical, and hydrogen.

Examples of polar silylating agents are those selected preferably from aminoethylaminopropyltrimethoxysilane, aminoethylaminopropyltriethoxysilane, diethylaminopropylmethyldimethoxysilane, diethylaminopropylmethyldiethoxysilane, cyclohexylaminopropyltrimethoxysilane, cyclohexylaminopropyldimethoxysilane, N,N'-bistrimethoxysilylpropylethylenediamine, 3-glycidyl-oxypropyltrimethoxysilane, 3-succinic acid-propyltrimethoxysilane, 3-mercaptopropyltrimethoxy-silane, 3-methacryloyloxypropyltriethoxysilane, 3-thioisocyanatopropyltrimethoxysilane, 3-thioisocyanatopropyltriethoxysilane, hydroxylethylene glycol-propyldimethyl-terminal polydimethylsiloxanes having a viscosity of more than 500 mPas, the sodium salt of phosphinato-silicon compounds of structure: P(O$_2$Na) [C$_2$H$_4$Si(CH$_3$)$_2$OSi(CH$_3$)$_2$C$_2$H$_4$Si(OCH$_3$)$_3$]$_2$ (phosphinatobis-[ethyldimethylsiloxyethyltrialkoxysilane]) and P(O$_2$Na) [C$_2$H$_4$Si(CH$_3$)$_2$OSi(CH$_3$)$_2$C$_2$H$_4$]$_n$.

Organosiloxane(s) IIb) may be composed of one or more identical or different units of the formula

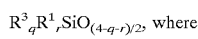

where q=0, 1, 2 or 3, r=0, 1 or 2, and q+r is <4.

The number of these units in an organosiloxane is at least 2.

The organosiloxanes are preferably liquid at the loading temperature. Among those having a viscosity of more than 1000 mPas, preference is given to those which can be dissolved in an industrially manageable solvent (as defined above) with a concentration >10% and a mixing viscosity of less than 1000 mPas at coating temperature. Among organosiloxanes which are solid at coating temperature, preference is given to those which can be dissolved in an industrially manageable solvent with a concentration of more than 10% and a mixing viscosity of less than 1000 mPas at coating temperature.

The silylating agents Ia and Ib and also IIa and IIb can be used alone or in any desired mixtures, with the proviso that silylating agents (II) containing polar groups make up at least 1–80% by weight, preferably 5–50% by weight, with particular preference 10–30% by weight, of the total amount of silylating agents (I) and (II), when both apolar and polar silica is to be produced.

Preparation:

The preparation (A) of the hydrophilic parent silica preferably takes place in accordance with the process previously described, as also does the silylation, i.e. the loading, reaction, and purification, unless otherwise noted.

Loading takes place at temperatures of 0–150° C., preferably 20–80° C., and most preferably 20–50° C.;

preferably, the loading step is cooled to 30–50° C. The residence time is 1 min to 24 h, preferably, for reasons of space-time yield, from 15 min to 180 min. The silylating agents are preferably added in liquid form. Preferably, the silylating agents are mixed into the pulverulent silica. This is preferably done by means of nozzle techniques, or comparable effective atomizing techniques, such as atomizing in 1-fluid nozzles under pressure (preferably from 5 to 20 bar), spraying from 2-fluid nozzles under pressure (preferably gas and liquid 2–20 bar), ultrafine distribution with atomizers or gas-solid exchange units with moving, rotary or static internals, which permit homogeneous distribution of the liquid silylating agents with the pulverulent silica. The silylating agent is added preferably in the form of a very finely divided aerosol which has a settling velocity of 0.1–20 cm/s. Charging of the silica and reaction with the silylating agent preferably take place with mechanical or gasborne fluidization. Mechanical fluidization is particularly preferred.

The reaction of the polar and apolar silylating agents takes place preferably at temperatures of 40–200° C., more preferably 80–160° C., and with particular preference 80–120° C. The reaction time is from 5 min to 48 h, preferably from 10 min to 4 h. Optionally, protic solvents may be added, such as liquid or evaporable alcohols or water; typical alcohols are isopropanol, ethanol, and methanol. Mixtures of the abovementioned protic solvents may also be added. It is preferred to add from 1 to 50% by weight of protic solvent, relative to the silica, with particular preference from 5 to 25% by weight. Water is particularly preferred. Optionally, it is possible to add acidic catalysts, of acidic nature in the manner of a Lewis acid or a Brönsted acid such as hydrogen chloride, or basic catalysts of basic nature in the manner of a Lewis base or a Brönsted base such as ammonia. These are preferably added in traces, i.e., at less than 1000 ppm. With particular preference, no catalysts are added.

The purification of reaction side products of the polar and apolar silylated silica is carried out at a purification temperature from 20° C. to 200° C., preferably from 50° C. to 150° C., and most preferably from 50° C. to 120° C. The purification step is preferably characterized by agitation, with slow agitation and gentle mixing being particularly preferred. The stirring elements are advantageously positioned and moved in such a way as to produce, mixing and fluidizing, but not complete vortexing.

The polar and apolar silylating agent are preferably used in an amount of more than 3% by weight, more preferably more than 10% by weight, of silylating agent (based on the silylating agent radicals attached to the silica following silylation), for a hydrophilic silica surface of 100 m$^2$/g BET surface area (measured by the BET method in accordance with DIN 66131 and 66132).

One further preferred subject (2) of the invention is a silica of low silanol group content having a homogeneously distributed and defined fraction of polar groups on the surface, having an average primary particle size of less than 100 nm, preferably having an average primary particle size of from 5 to 50 nm, the primary particles not existing only in isolation in the silica but instead being constituents of larger aggregates (as defined in DIN 53206) which have a diameter of from 100 to 1000 nm and make up agglomerates (as defined in DIN 53206) which depending on the external shearing load have sizes of from 1 to 500 μm, the silica having a specific surface area of from 10 to 300 m$^2$/g (measured by the BET method to DIN 66131 and 66132), a fractal mass dimension $D_m$ of less than or equal to 2.8, preferably less than or equal to 2.7, more preferably from 2.4 to 2.6, and a surface silanol group (SiOH) density of less than 0.6 SiOH/nm$^2$, preferably less than 0.25 SiOH/nm$^2$, more preferably less than 0.15 SiOH/nm$^2$, and per 100 m$^2$/g specific surface area (measured by the BET method to DIN 66131 and 66132) a carbon content of at least 1.0% by weight, preferably greater than 1.5% by weight. On contact with water the further silica (2) of the invention has no wettable fractions.

A particular feature of the further silica (2) of the invention is that its surface has a homogeneous and defined fraction of polar functions. These and the silylating agent residues, and residual unreacted silanol groups, are distributed with a homogeneous uniformity, even at the microscopic level. This can be demonstrated, for example, by means of solvatochromism, e.g., using bisphenylenedicyanoiron(II) in dichloroethane, or by means of adsorption measurements, such as static-volumetric gas adsorption or inverse gas chromatography.

The further silica (2) of the invention has an average primary particle size of less than 100 nm, preferably an average primary particle size of from 5 to 50 nm. As indicated previously, primary particles do not exist in isolation in the silicas, but instead are constituents of larger aggregates and agglomerates. The further silica (2) of the invention in particular has a specific surface area of more than 25 m$^2$/g (measured by the BET method to DIN 66131 and 66132).

The further Silica (2) of the invention is composed of aggregates (as defined in DIN 53206) with diameters in the range from 100 to 1000 nm, preferably from 100 to 500 nm, most preferably from 100 to 250 nm, and agglomerates (as defined in DIN 53206) which under shearing-free or low-shear measuring conditions preferably have a size of from 1 μm to 500 μm, preferably.

The further Silica (2) of the invention has per 100 m$^2$/g of specific surface (measured by the BET method to DIN 66131 and 66132) a carbon content of at least 1.0% by weight, preferably greater than 1.5% by weight, and a surface silanol group (SiOH) density of less than 0.6 SiOH/nm$^2$, preferably less than 0.25 SiOH/nm$^2$, more preferably less than 0.15 SiOH/nm$^2$.

Particular characteristics of the silica of the invention are that its surface is physicochemically homogeneous and that the residues of silylating agent, polar groups and the residual, unreacted silanol groups are distributed with a homogeneous uniformity, even at the microscopic level. This can be demonstrated by means of adsorption measurements, such as static-volumetric gas adsorption or inverse gas chromatography.

In one preferred embodiment, the silica of the invention possesses a fully chemically bonded silylating agent coat i.e., less than 0.5% by weight of the organosilicon silylating agent coat extractable with tetrahydrofuran at T=25° C., detection of the organosilicon compounds extracted advantageously taking place by means of silicon-specific atomic absorption spectrometry.

The further silica (2) of the invention has the additional feature that in pulverulent systems it displays adhesion to the powder surfaces, and so does not tend toward reagglomeration, and toward separation, and therefore permits load-stable and storage-stable mixtures of silica powders. This applies in particular to its use in nonmagnetic and magnetic toners and developers, which may be 1-component and 2-component systems.

Surprisingly it has now been found that the omission of added water in the purification step of the preparation of the hydrophilic silica which is reacted with silylating agents (I)

and (II) results in a greater reactivity of the silica surface. Further, surprisingly, it has been found that the silylation of such a silica leads to the formation of a uniform and homogeneous silylating agent coat, and thus to a homogeneous distribution of polar and apolar groups. This enables a defined distribution of polar and apolar groups on the silylating agent surface to be set in a controlled fashion.

Surprisingly it has also been found that the recycling of the reaction by-products and purification offproducts of the silylating reaction back to the step of coating results in more effective coating and in an increased reaction yield. This recycling takes place preferably in the noncondensed phase, i.e., as a gas or as a vapor. This recycling may take place as mass transport along a pressure compensation or as controlled mass transport with the gas transport systems customary in the art, such as fans and pumps, including compressed air diaphragm pumps. Since the recycling of the noncondensed phase is preferred, it may be advisable to heat the recycle lines. Higher reaction yields and increased degrees of silylation are obtained.

Advantages of this aspect of the invention are:

High reaction yields, and hence economical and sparing of resources;

High degree of silylation for minimal use of silylating agent;

Controlled setting of a defined ratio of polar to apolar groups on the silica surface; and Homogeneous distribution of polar groups alongside apolar groups in the surface coat of the silica.

Further subject matter provided comprises toners, developers, charge control agents and/or flow aids for pulverulent systems which comprise the further silica (2) of the invention. Typical toner composition have been previously described.

A disadvantage of apolar silica arises when it is used as an active filler in liquid systems, polymer systems, and resin systems of medium and high polarity. Problems of miscibility and compatibility occur here. This is disadvantageous when close integration of the silica with the surrounding matrix is required. The homogeneous incorporation, according to the invention, of controlled fractions of polar functions into the surface of a silica with a low silanol group content overcomes this disadvantage and raises the mechanical properties such as hardness, strength, toughness, and abrasion resistance, etc., of the silica-matrix compound.

Further characteristics of the silica of the invention are that it exhibits a high thickening effect in polar systems, such as solvent-free crosslinkable polymers and/or resins, or such as solutions, suspensions, emulsions, and dispersions of organic resins in aqueous systems or organic solvents (e.g.: polyesters, vinyl esters, epoxy, polyurethane, alkyd resins, etc.), and is therefore suitable as a theological additive to these systems.

Further characteristics of the silica of the invention are that it has a low thickening effect in apolar systems, such as uncrosslinked silicone rubber, but at the same time exhibits a high reinforcing effect in the crosslinked silicone rubbers, and is therefore outstandingly suitable for use as a reinforcing filler for silicone rubbers.

The further silica (2) of the invention provides optimum chemical crosslinking with the surrounding matrix in reactive polymers and resins. In this respect, disadvantages of a high level of apolarity of silica when used as an additive, e.g., as antiblocking agent, as free-flow aid, or for controlling or regulating triboelectric properties with solids, especially finely divided solids such as crosslinked polymer systems and resin systems or finely divided inorganic solids, include problems with respect to miscibility and compatibility resulting from the apolarity. This leads to separation of the silica when used as a free-flow aid and/or charge regulator in pulverulent products such as powder resin systems, powder coatings, and toners and developers. This separation is associated with poor silica-powder particle interaction. The consequences of this separation include the destabilization and poor service life of the system, i.e., in the case of toner-silica mixtures, for example, poor stability on exposure to repeated copying and activating processes. The incorporation, according to the invention, of controlled fractions of polar functions into the surface of a silica of low silanol group content overcomes this disadvantage and raises long-term stability of these systems.

The invention relates additionally to the use of the homogeneously silylated silica of the invention in developers and toners, e.g., nonmagnetic and magnetic toners, which may be 1-component or 2-component systems. These toners may be composed of resins, such as styrene resins and acrylic resins, and mixtures thereof, or polyester resins and epoxy resins, and mixtures thereof, and may have been ground preferably to particle distributions of 1–100 $\mu$m, or may be resins which have been prepared in polymerization processes in dispersion or emulsion or solution or in bulk to particle distributions of preferably 1–100 $\mu$m. The Silica is preferably used for improving and controlling the flow properties of powder and/or for regulating and controlling the triboelectric charging properties of the toner or developer. Toners and developers of this kind can be used with preference in electrophotographic printing processes, and can also be used in direct image transfer processes. The same is true in pulverulent resins which are used as coating systems.

Another application is the use of the silica in the manufacture of synthetic teeth and in polymer-based dental fillings, as a filler, for the purpose, for example, of improving the mechanical strength, and/or the abrasion resistance.

A further application is the use in paints and inks, especially for obtaining hardness, which is needed for scratch resistance.

EXAMPLES

Preparation of the Hydrophilic Parent Silica

In a mixing chamber, 10.8 kg/h silicon tetrachloride are mixed homogeneously with 74.3 m$^3$/h(STP) primary air and 20.7 m$^3$/h(STP) hydrogen gas and the mixture is passed into a combustion chamber in a burner nozzle of known construction in a flame. Additionally, 12.0 m$^3$/h(STP) secondary air are blown into the combustion chamber. Following exit from the combustion chamber, the resulting silica/gas mixture is cooled to 120–150° C. in a heat exchanger system and then the solid silica is separated from the hydrogen chloride-containing gas phase, in a filter system. Subsequently, at an elevated temperature, residues of hydrogen chloride are removed by adding air heated by the combustion of natural gas, without further addition of water or moisture. This gives a pyrogenic silica having a specific surface area, measured by the BET method in accordance with DIN 66131 and 66132, of 200 m$^2$/g, with the 4% (% by weight) dispersion (DIN/ISO 787/9) having a pH of 4.1.

Preparation of silica, low in silanol groups, having a homogeneous surface (1).

Example 1.1

In a continuous apparatus, 50 g/h deionized water (DI water) in very finely divided form is added through a nozzle, under inert gas (N$_2$) and at a temperature of 105° C., to a mass flow of 1000 g/h hydrophilic Silica, having a moisture content<1% and an HCl content<100 ppm and having a specific surface area of 200 m$^2$/g (measured by the BET method in accordance with DIN 66131 and 66132) (WACKER HDK N20 from Wacker-Chemie GmbH, Burghausen, Germany); 150 g/h OH-terminal polydimethylsiloxane (PDMS) (viscosity: 40 mPas at 25° C.) are added in liquid, very finely divided form by atomization through a one-fluid nozzle (pressure: 10 bar), and 30 g/h dimethyldichlorosilane are added by atomization through a one-fluid nozzle (pressure: 7 bar). With a residence time of 2 hours at a temperature of 105° C., the Silica thus laden is fluidized further by means of stirring and then reacted at 300° C. in a reactor situated below. It is then purified of HCl in a mechanically agitated dryer at 250° C. with an N$_2$ flow at 0.3 cm/s. The products of side reactions and purification off-products of the reaction are 20% recycled to the silica coating stage. The product is a white hydrophobic Silica powder with a homogeneous silylating agent coat. Data in Table 1-1.

Example 1.2

In a continuous apparatus, 50 g/h DI water in very finely divided form is added through a nozzle, under inert gas (N$_2$) and at a temperature of 105° C., to a mass flow of 1000 g/h hydrophilic Silica, having a moisture content<1% and an HCl content<100 ppm and having a specific surface area of 200 m$^2$/g (measured by the BET method in accordance with DIN 66131 and 66132) (WACKER HDK N20 from Wacker-Chemie GmbH, Burghausen, Germany); 150 g/h liquid MQ resin (having a viscosity of 120 mPas at 25° C. and an M:Q of 2.5:1) are added in liquid, very finely divided form by atomization through a one-fluid nozzle (pressure: 15 bar), and 150 g/h dimethyldichlorosilane are added by atomization through a one-fluid nozzle (pressure: 5 bar). With a residence time of 1.3 hours at a temperature of 105° C., the Silica thus laden is fluidized further by means of stirring and then reacted at 350° C. in a reactor situated below. It is then purified of HCl in a mechanically agitated dryer at 250° C. with an N$_2$ flow at 0.3 cm/s. The products of side reactions and purification offproducts of the reaction are 50% recycled to the silica coating stage. The product is a white hydrophobic Silica powder with a homogeneous silylating agent coat. Data in Table 1-1.

Example 1.3

In a continuous apparatus, 50 g/h DI water in very finely divided form is added through a nozzle, under inert gas (N$_2$) and at a temperature of 25° C., to a mass flow of 1000 g/h hydrophilic Silica, having a moisture content<1% and an HCl content<100 ppm and having a specific surface area of 200 m$^2$/g (measured by the BET method in accordance with DIN 66131 and 66132) (WACKER HDK N20 from Wacker-Chemie GmbH, Burghausen, Germany); 150 g/h OH-terminal PDMS (viscosity: 40 mPas at 25° C.) are added in liquid, very finely divided form by atomization through a one-fluid nozzle (pressure: 10 bar), and 50 g/h hexamethyldisilazane are added by atomization through a one-fluid nozzle (pressure: 5 bar). With a residence time of 2.5 hours at a temperature of 25° C., the Silica thus laden is fluidized further by means of stirring and then reacted at 80° C. in a reactor situated below. It is then purified of NH$_3$ in a mechanically agitated dryer at 140° C. with an N$_2$ flow at 0.3 cm/s. The products of side reactions and purification off-products of the reaction are 33% recycled to the silica coating stage. The product is a white hydrophobic Silica powder with a homogeneous silylating agent coat. Data in Table 1-1.

Example 1.4

In a continuous apparatus, 15 g/h DI water in very finely divided form is added through a nozzle, under inert gas (N$_2$) and at a temperature of 25° C., to a mass flow of 1000 g/h hydrophilic Silica, having a moisture content<1% and an HCl content<100 ppm and having a specific surface area of 50 m$^2$/g (measured by the BET method in accordance with DIN 66131 and 66132) (WACKER HDK D05 from Wacker-Chemie GmbH, Burghausen, Germany); 40 g/h OH-terminal PDMS (viscosity: 40 mPas at 25° C.) are added in liquid, very finely divided form by atomization through a one-fluid nozzle (pressure: 10 bar), and 15 g/h hexamethyldisilazane are added by atomization through a one-fluid nozzle (pressure: 5 bar). With a residence time of 2.5 hours at a temperature of 25° C., the Silica thus laden is fluidized further by means of stirring and then reacted at 80° C. in a reactor situated below. It is then purified of NH$_3$ in a mechanically agitated dryer at 140° C. with an N$_2$ flow at 0.3 cm/s. The products of side reactions and purification off-products of the reaction are 33% recycled to the silica coating stage. The product is a white hydrophobic Silica powder with a homogeneous silylating agent coat. Data in Table 1-1.

TABLE 1-1

| Example | % C | % Y | % SiOH | WT | MN | DRIFT | MRN | π* | IGC |
|---|---|---|---|---|---|---|---|---|---|
| 1.1 | 4.1 | 96 | 12 | no | 50 | 0 | 4 | <1 | <30 mJ/m$^2$ |
| 1.2 | 3.5 | 90 | 22 | no | 55 | 0 | 5 | <1 | <30 mJ/m$^2$ |
| 1.3 | 5.4 | 94 | 7 | no | 70 | 0 | 5 | <1 | <30 mJ/m$^2$ |
| 1.4 | 1.7 | 94 | 5 | no | 70 | 0 | 5 | <1 | <30 mJ/m$^2$ |

Description of Analytical Methods 1
1. Carbon content (% C)
   Elemental analysis for carbon; combustion of the sample at >1000° C. in a stream of O$_2$, detection and quantification of the resulting CO$_2$ by IR; instrument: LECO 244
2. Reaction yield (% Y)
   Calculated from the expected theoretical carbon content % C-theor and the experimentally found carbon content % C-exp: % yield=% C-exp/% C-theor*100%
3. Residual unsilylated Silica silanol group content (% SiOH)
   Method: acid-based titration of the silica in suspension in 50:50 water/methanol; Sears titration (G. W. Sears, Anal. Chem., 28(12), (1956), 1981)
   Titration is carried out in the pH range of the isoelectric point and below the dissolution of the silica
   untreated silica with 100% SiOH (Silica surface silanol groups): SiOH-phil=1.8 SiOH/nm$^2$
   silylated silica: SiOH-silylated
   silica residual silanol content: % SiOH=SiOH-silylated/SiOH-phil*100%

4. Test (yes/no) of wettability with water (WT)

The silica is shaken with an equal volume of water;

in the case of wetting (hydrophilic) Silica sinks: YES;

in the case of no wetting (hydrophobic), Silica floats: NO.

5. Test (volume % MeOH in water) of wettability with water/methanol

Mixtures=methanol number (MN): the silica is shaken with an equal volume of water/methanol mixture start with 0% methanol if there is no wetting, Silica floats: use mixture with MeOH content higher by 5% by volume if there is wetting, Silica sinks: fraction of MeOH (%) in water gives MN 6. Intensity of the band for isolated OH stretching vibration at 3750 cm$^{-1}$ measured by DRIFT (diffuse reflectance infrared fourier transformation spectroscopy) based on the intensity of the band for untreated silica: % SiOH-3750 1/cm=int-silyl/int-phil*100%

7. Polarity measured via solvatochromism using methyl red in toluene (MRN)

dissolution of 20 mg of methyl red in toluene suspending of 0.5 g of silica in 10 ml of toluenic methyl red solution; visual assessment of the color of the suspension:

| | | |
|---|---|---|
| violet | 0 | untreated silica |
| reddish violet | 1 | |
| red | 2 | |
| reddish orange | 3 | |
| orange | 4 | |
| yellowish orange | 5 | fully silylated silica |

8. Dipolarity π*, measured via solvatochromism (using bisphenylenedicyanoiron(II) in dichloroethane): π*<1.0.

9. Homogeneity of the structure of the silyating agent coat on the silica surface, measured by inverse gas chromatography (IGC)

Example 1.5
Charging Behavior of the Silica 50 g of a ferrite carrier having an average particle diameter of 80 μm are mixed with 0.5 g of each of the Silicas from Examples 1.3 and 1.4 at room temperature by shaking in a 100 ml PE vessel for 15 minutes. Prior to measurement, these mixtures are activated on a roller bed at 64 rpm in a closed 100 ml PE vessel for 5 minutes. Using a "hard-blow-off cell" (approximately 3 g of Silica, capacity 10 nF, 45 μm screen, air flow 1 1/min, air pressure 2.4 kPa, measuring time 90 seconds) (EPPING GmbH, D-85375 Neufahrn), the triboelectric charging behavior of the Silica is measured, as the ratio of Silica charge per Silica mass (q/m).

TABLE 1-2

| Example 1.5 | Charge behavior q/m against ferrite [μC/g] |
|---|---|
| Carrier + Example 1.3 | −530 |
| Carrier + Example 1.4 | −460 |

Example 1.6
Flow Behavior and Charge Behavior of Silica Toner 100 g of a Silica-free magnetic 1-component dry toner, negatively charging, "chemically processed toner produced by a polymerization process" based on styrene-methacrylate copolymer, having an average particle size of 14 μm are mixed at room temperature for 1 hour with 0.4 g of a Silica according to Examples 1.3 and 1.4 in a tumble mixer (e.g., Turbular™). Following a toner loading time of 20 minutes (corresponding to the loading experienced after 1000 copying operations), the charging (charge per mass) of the finished Silica toner and the flow behavior (mass flow) of the finished Silica toner to the developing roller in a "q/m mono" electrometer/flow tester (EPPING GmbH, D-85375 Neufahrn) are measured.

TABLE 1-3

| Example 1.6 | Toner charge [μC/g] | Flow behavior [mg] |
|---|---|---|
| Silica-free toner | −1.5 | 2 |
| Toner + Example 1.3 | −2.01 | 46 |
| Toner + Example 1.4 | −1.93 | 48 |

Example 1.7
Flow Behavior and Charge Behavior of Silica Polymerization Toner 100 g of a Silica-free magnetic 1-component dry toner, negatively charging, "crushed" type, based on styrene-methacrylate copolymer, having an average particle size of 14 μm (obtainable, for example, from IMEX, Japan) are mixed at room temperature for 1 hour with 0.4 g of a Silica according to Examples 1.3 and 1.4 in a tumble mixer (e.g., Turbular™). Following a toner loading time of 20 minutes (corresponding to the loading experienced after 1000 copying operations), the charging (charge per mass) of the finished Silica toner and the flow behavior (mass flow) of the finished Silica toner to the developing roller in a "q/m mono" electrometer/flow tester (EPPING GmbH, D-85375 Neufahrn) are measured.

TABLE 1-4

| Example 1.7 | Toner charge [μC/g] | Flow behavior [mg] |
|---|---|---|
| Silica-free toner | −1.7 | 12 |
| Polymerization toner + Example 1.3 | −1.83 | 38 |
| Polymerization toner + Example 1.4 | −1.71 | 45 |

Example 1.8
Flow Behavior and Charge Behavior of Silica Toner 100 g of a Silica-free toner, compounded from 88 g of a binder resin (negatively charging, crushed solid resin type), based on polyester (cocondensate of phenyl-containing PPO and phthalic anhydride), having an average particle size of 10 μm, 8 g of a pigment-grade carbon black (Cabot Regal 400R), 2 g of a negatively controlling charge regulator (Aizen Spilon Black T-77, Hodogaya Chem.), and 2 g of a wax (Viscol TS-200, Sanyo Chem.) are admixed at room temperature for 1 hour to 1.5 g of a Silica according to Example 1.3 in a tumble mixer (e.g., Turbular™). After a toner load time of 20 minutes (corresponding to the loading experienced after 1000 copying operations), the charging (charge per mass) of the finished Silica toner and the flow behavior (mass flow) of the finished Silica toner to the developing roller in a "q/m mono" electrometer/flow tester (EPPING GmbH, D-85375 Neufahrn) are measured.

TABLE 1-5

| | Toner charge [μC/g] | Flow behavior [mg] |
|---|---|---|
| Silica-free toner | −1.8 | 14 |
| Example 1.8 | −2.05 | 37 |

Example 1.9
Flow Behavior and Charge Behavior of Silica Toner 98 g of a Silica-free toner, compounded from 90 g of a binder resin (negatively charging, crushed solid resin type), based on polyester (cocondensate of phenyl-containing PPO and phthalic anhydride), having an average particle size of 10 μm, 5 g of a pigment-grade carbon black (Mitsubishi Carbon Black No. 44), 1 g of a positively controlling charge regulator (Bontron S-34, Orient Chem.), and 2 g of a wax (Viscol 550P, Sanyo Chem.) are admixed at room temperature for 1 hour to 1.5 g of a Silica according to Example 1.3 in a tumble mixer (e.g., Turbular™). After a toner load time of 20 minutes (corresponding to the loading experienced after 1000 copying operations), the charging (charge per mass) of the finished Silica toner and the flow behavior (mass flow) of the finished Silica toner to the developing roller in a "q/m mono" electrometer/flow tester (EPPING GmbH, D-85375 Neufahrn) are measured.

TABLE 1-6

| | Toner charge [μC/g] | Flow behavior [mg] |
|---|---|---|
| Silica-free toner | 1.8 | 7 |
| Example 1.9 | 0.25 | 27 |

Preparation of the low-silanol-group silica (2) with homogeneous surface distribution of polar groups Example 2.1

In a continuous apparatus, 50 g/h deionized water (DI water) in very finely divided form is added through a nozzle, under inert gas ($N_2$) and at a temperature of 35° C., to a mass flow of 1000 g/h hydrophilic Silica, and having a specific surface area of 200 $m^2$/g (measured by the BET method in accordance with DIN 66131 and 66132) (WACKER HDK N20 from Wacker-Chemie GmbH, Burghausen, Germany); 100 g/h OH-terminal polydimethylsiloxane (PDMS) (viscosity: 40 mPas at 25° C.) are added in liquid, very finely divided form by atomization through a one-fluid nozzle (pressure: 10 bar), and 150 g/h of a freshly prepared 1:2 mixture of 3-aminoethylaminopropyltrimethoxysilane (Wacker GF91 Silane) and water are added by atomization through a one-fluid nozzle (pressure: 7 bar). With a residence time of 2 hours at a temperature of 35° C., the Silica thus laden is fluidized further by means of stirring and then reacted at 80° C. in a reactor situated below. It is then purified of volatiles in a mechanically agitated dryer at 120° C. with an $N_2$ flow at 0.1 cm/s. The products of side reactions and purification offproducts of the reaction are 33% recycled to the silica coating stage. The product is a white hydrophobic Silica powder with a homogeneous distribution of polar and apolar groups in the silylating agent coat. Data in Table 2–1.

Example 2.2

In a continuous apparatus, 50 g/h DI water in very finely divided form is added through a nozzle, under inert gas ($N_2$) and at a temperature of 35° C., to a mass flow of 1000 g/h hydrophilic Silica, and having a specific surface area of 200 $m^2$/g (measured by the BET method in accordance with DIN 66131 and 66132) (WACKER HDK N20 from Wacker-Chemie GmbH, Burghausen, Germany); 100 g/h OH-terminal PDMS (viscosity: 40 mPas at 25° C.) are added in liquid, very finely divided form by atomization through a one-fluid nozzle (pressure: 10 bar), and 150 g/h of a freshly prepared 1:2 mixture of N,N'-diethyl-3-aminopropylmethyldimethoxysilane and methanol are added by atomization through a one-fluid nozzle (pressure: 7 bar). With a residence time of 2 hours at a temperature of 35° C., the Silica thus laden is fluidized further by means of stirring and then reacted at 80° C. in a reactor situated below. It is then purified of volatiles in a mechanically agitated dryer at 120° C. with an $N_2$ flow at 0.1 cm/s. The products of side reactions and purification offproducts of the reaction are 33% recycled to the silica coating stage. The product is a white hydrophobic Silica powder with a homogeneous distribution of polar and apolar groups in the silylating agent coat. Data in Table 2–1.

Example 2.3

In a continuous apparatus, 50 g/h DI water in very finely divided form is added through a nozzle, under inert gas ($N_2$) and at a temperature of 35° C., to a mass flow of 1000 g/h hydrophilic Silica, and having a specific surface area of 200 $m^2$/g (measured by the BET method in accordance with DIN 66131 and 66132) (WACKER HDK N20 from Wacker-Chemie GmbH, Burghausen, Germany); 100 g/h OH-terminal PDMS (viscosity: 40 mPas at 25° C.) are added in liquid, very finely divided form by atomization through a one-fluid nozzle (pressure: 10 bar), and 150 g/h of a 1:2 mixture of N,N'-bistrimethoxysilylpropylethylenediamine and methanol are added by atomization through a one-fluid nozzle (pressure: 7 bar). With a residence time of 2 hours at a temperature of 35° C., the Silica thus laden is fluidized further by means of stirring and then reacted at 80° C. in a reactor situated below. It is then purified of volatiles in a mechanically agitated dryer at 120° C. with an $N_2$ flow at 0.1 cm/s. The products of side reactions and purification offproducts of the reaction are 33% recycled to the silica coating stage. The product is a white hydrophobic Silica powder with a homogeneous distribution of polar and apolar groups in the silylating agent coat. Data in Table 2–1.

Example 2.4

In a continuous apparatus, 50 g/h DI water in very finely divided form is added through a nozzle, under inert gas ($N_2$) and at a temperature of 35° C., to a mass flow of 1000 g/h hydrophilic Silica, and having a specific surface area of 200 $m^2$/g (measured by the BET method in accordance with DIN 66131 and 66132) (WACKER HDK N20 from Wacker-Chemie GmbH, Burghausen, Germany); 100 g/h OH-terminal PDMS (viscosity: 40 mPas at 25° C.) are added in liquid, very finely divided form by atomization through a one-fluid nozzle (pressure: 10 bar), and 150 g/h of a freshly prepared 1:2 mixture of 3-methacryloyloxypropyltriethoxysilane (Wacker GF31 Silane) and methanol are added by atomization through a one-fluid nozzle (pressure: 7 bar). With a residence time of 2 hours at a temperature of 35° C., the Silica thus laden is fluidized further by means of stirring and then reacted at 80° C. in a reactor situated below. It is then purified of the volatile matter in a mechanically agitated dryer at 120° C. with an $N_2$ flow at 0.1 cm/s. The products of side reactions and purification offproducts of the reaction are 33% recycled to the silica coating stage. The product is a white hydrophobic Silica powder with a homogeneous distribution of polar and apolar groups in the silylating agent coat. Data in Table 2–1.

Example 2.5

In a continuous apparatus, 50 g/h DI water in very finely divided form is added through a nozzle, under inert gas ($N_2$) and at a temperature of 35° C., to a mass flow of 1000 g/h hydrophilic Silica, and having a specific surface area of 200 $m^2/g$ (measured by the BET method in accordance with DIN 66131 and 66132) (WACKER HDK N20 from Wacker-Chemie GmbH, Burghausen, Germany); 100 g/h OH-terminal PDMS (viscosity: 40 mPas at 25° C.) are added in liquid, very finely divided form by atomization through a one-fluid nozzle (pressure: 10 bar), and 150 g/h of a freshly prepared 1:2 mixture of 3-glycidyloxypropyltriethoxysilane (Wacker GF82 Silane) and methanol are added by atomization through a one-fluid nozzle (pressure: 7 bar). With a residence time of 2 hours at a temperature of 35° C., the Silica thus laden is fluidized further by means of stirring and then reacted at 80° C. in a reactor situated below. It is then purified of the volatile matter in a mechanically agitated dryer at 120° C. with an $N_2$ flow at 0.1 cm/s. The products of side reactions and purification offproducts of the reaction are 33% recycled to the silica coating stage. The product is a white hydrophobic Silica powder with a homogeneous distribution of polar and apolar groups in the silylating agent coat. Data in Table 2–1.

Example 2.6

In a continuous apparatus, 50 g/h DI water in very finely divided form is added through a nozzle, under inert gas ($N_2$) and at a temperature of 35° C., to a mass flow of 1000 g/h hydrophilic Silica, and having a specific surface area of 200 $m^2/g$ (measured by the BET method in accordance with DIN 66131 and 66132) (WACKER HDK N20 from Wacker-Chemie GmbH, Burghausen, Germany); 100 g/h OH-terminal PDMS (viscosity: 40 mPas at 25° C.) are added in liquid, very finely divided form by atomization through a one-fluid nozzle (pressure: 10 bar), and 150 g/h of a 1:2 mixture of phosphinatobis[ethyldimethylsiloxyethyldimethyltrimethoxysilane] sodium salt and water are added by atomization through a one-fluid nozzle (pressure: 7 bar). With a residence time of 2 hours at a temperature of 35° C., the Silica thus laden is fluidized further by means of stirring and then reacted at 80° C. in a reactor situated below. It is then purified of volatiles in a mechanically agitated dryer at 120° C. with an $N_2$ flow at 0.1 cm/s. The products of side reactions and purification offproducts of the reaction are 33% recycled to the silica coating stage. The product is a white hydrophobic Silica powder with a homogeneous distribution of polar and apolar groups in the silylating agent coat. Data in Table 2–1.

Example 2.7

In a continuous apparatus, 50 g/h DI water in very finely divided form is added through a nozzle, under inert gas ($N_2$) and at a temperature of 35° C., to a mass flow of 1000 g/h hydrophilic Silica, and having a specific surface area of 200 $m^2/g$ (measured by the BET method in accordance with DIN 66131 and 66132) (WACKER HDK N20 from Wacker-Chemie GmbH, Burghausen, Germany); 100 g/h OH-terminal PDMS (viscosity: 40 mPas at 25° C.) are added in liquid, very finely divided form by atomization through a one-fluid nozzle (pressure: 10 bar), and 150 g/h of a 1:2 mixture of a hydroxy-terminal polyethylene oxide-propylpolydimethylsiloxane with a viscosity of 100 mPas at 25° C. (available from Wacker under the name IM22) and water are added by atomization through a one-fluid nozzle (pressure: 7 bar). With a residence time of 2 hours at a temperature of 35° C., the Silica thus laden is fluidized further by means of stirring and then reacted at 80° C. in a reactor situated below. It is then purified of the volatile matter in a mechanically agitated dryer at 120° C. with an $N_2$ flow at 0.1 cm/s. The products of side reactions and purification offproducts of the reaction are 33% recycled to the silica coating stage. The product is a white hydrophobic Silica powder with a homogeneous distribution of polar and apolar groups in the silylating agent coat. Data in Table 2–1.

Example 2.8

In a continuous apparatus, 50 g/h DI water in very finely divided form is added through a nozzle, under inert gas ($N_2$) and at a temperature of 35° C., to a mass flow of 1000 g/h hydrophilic Silica, and having a specific surface area of 200 $m^2/g$ (measured by the BET method in accordance with DIN 66131 and 66132) (WACKER HDK N20 from Wacker-Chemie GmbH, Burghausen, Germany); 100 g/h OH-terminal PDMS (viscosity: 40 mPas at 25° C.) are added in liquid, very finely divided form by atomization through a one-fluid nozzle (pressure: 10 bar), and 150 g/h of a freshly prepared 1:2 mixture of a 3-mercaptopropyltrimethoxysilane (available from Wacker under the name GF70) and ethanol are added by atomization through a one-fluid nozzle (pressure: 7 bar). With a residence time of 2 hours at a temperature of 35° C., the Silica thus laden is fluidized further by means of stirring and then reacted at 80° C. in a reactor situated below. It is then purified of the volatile matter in a mechanically agitated dryer at 120° C. with an $N_2$ flow at 0.1 cm/s. The products of side reactions and purification offproducts of the reaction are 33% recycled to the silica coating stage. The product is a white hydrophobic Silica powder with a homogeneous distribution of polar and apolar groups in the silylating agent coat. Data in Table 2–1.

Example 2.9

In a continuous apparatus, 50 g/h DI water in very finely divided form is added through a nozzle, under inert gas ($N_2$) and at a temperature of 35° C., to a mass flow of 1000 g/h hydrophilic Silica, and having a specific surface area of 200 $m^2/g$ (measured by the BET method in accordance with DIN 66131 and 66132) (WACKER HDK N20 from Wacker-Chemie GmbH, Burghausen, Germany); 100 g/h OH-terminal PDMS (viscosity: 40 mPas at 25° C.) are added in liquid, very finely divided form by atomization through a one-fluid nozzle (pressure: 10 bar), and 150 g/h of a freshly prepared 1:2 mixture of a 3-cyclohexylaminopropyltrimethoxysilane (available from Wacker under the name GF92) and ethanol are added by atomization through a one-fluid nozzle (pressure: 7 bar). With a residence time of 2 hours at a temperature of 35° C., the Silica thus laden is fluidized further by means of stirring and then reacted at 80° C. in a reactor situated below. It is then purified of volatiles in a mechanically agitated dryer at 120° C. with an $N_2$ flow at 0.1 cm/s. The products of side reactions and purification offproducts of the reaction are 33% recycled to the silica coating stage. The product is a white hydrophobic Silica powder with a homogeneous distribution of polar and apolar groups in the silylating agent coat. Data in Table 2–1.

Example 2.10

In a continuous apparatus there are added under inert gas ($N_2$) and at a temperature of 35° C., to a mass flow of 1000 g/h hydrophilic Silica, having a specific surface area of 200 m$^2$/g (measured by the BET method in accordance with DIN 66131 and 66132) (WACKER HDK N20 from Wacker-Chemie GmbH, Burghausen, Germany), 100 g/h OH-terminal PDMS (viscosity: 40 mPas at 25° C.), added in liquid, very finely divided form by atomization through a one-fluid nozzle (pressure: 10 bar), and 50 g/h of a polyhydromethyl-siloxane are added by atomization through a one-fluid nozzle (pressure: 7 bar). With a residence time of 2 hours at a temperature of 35° C., the Silica thus laden is fluidized further by means of stirring and then reacted at 80° C. in a reactor situated below. It is then purified of volatiles in a mechanically agitated dryer at 120° C. with an $N_2$ flow at 0.1 cm/s. The products of side reactions and purification offproducts of the reaction are 33% recycled to the silica coating stage. The product is a white hydrophobic Silica powder with a homogeneous and defined distribution of polar and apolar groups in the silylating agent coat.

Data in Table 2-1.

TABLE 2-1

| Example | % Y | % SiOH |
|---|---|---|
| 2.1 | 93 | 2 |
| 2.2 | 92 | 3 |
| 2.3 | 95 | 3 |
| 2.4 | 94 | 7 |
| 2.5 | 92 | 8 |
| 2.6 | 96 | 1 |
| 2.7 | 90 | 12 |
| 2.8 | 94 | 13 |
| 2.9 | 94 | 6 |
| 2.10 | 89 | n.a. |

Description of Analytical Methods 2

2–1. Reaction yield (% Y)
1. calculated from the expected theoretical carbon content % C-theor and the experimentally found carbon content % C-exp: % yield=% C-exp/% C-theor*100%

2–2. Residual unsilylated Silica silanol group content (% SiOH)

Method: acid-based titration of the silica in suspension in 50:50 water/methanol;

Sears titration (G. W. Sears, Anal. Chem., 28(12), (1956), 1981)
2. Titration is carried out in the pH range of the isoelectric point and below the dissolution of the silica
3. untreated silica with 100% SiOH (Silica surface silanol groups): SiOH-phil=1.8 SiOH/nm$^2$
4. silylated silica: SiOH-silylated
5. silica residual silanol content: % SiOH=SiOH-silylated/SiOH-phil*100%

Example 2.11

Charging Behavior of the Silica 50 g of a ferrite carrier having an average particle diameter of 80 μm are mixed with 0.5 g of each of the silicas from Examples 2.1–2.4 at room temperature (RT) by shaking in a 100 ml PE vessel for 15 minutes. Prior to measurement, these mixtures are activated on a roller bed at 64 rpm in a closed 100 ml PE vessel for 5 minutes. Using a "hard-blow-off cell" (approximately 3 g of Silica, capacity 10 nF, 45 μm screen, air flow 1 1/min, air pressure 2.4 kPa, measuring time 90 seconds) (EPPING GmbH, D-85375 Neufahrn), the triboelectric charging behavior of the Silica is measured, as the ratio of Silica charge per Silica mass (q/m).

TABLE 2-2

| | Charge behavior q/m against ferrite [μC/g] |
|---|---|
| Carrier + Example 2.1 | −10 |
| Carrier + Example 2.2 | 10 |
| Carrier + Example 2.3 | 20 |
| Carrier + Example 2.4 | −460 |

Example 2.12

Flow Behavior and Charge Behavior of Silica Toner 100 g of a Silica-free magnetic 1-component dry toner, negatively charging, "crushed" type, based on styrene-methacrylate copolymer, having an average particle size of 14 μm (obtainable, for example, from IMEX, Japan) are mixed at room temperature for 1 hour with 0.4 g of a Silica according to Example 2.6 in a tumble mixer (e.g., Turbular™). Following a toner loading time of 20 minutes (corresponding to the loading experienced after 1000 copying operations), the charging (charge per mass) of the finished Silica toner and the flow behavior (mass flow) of the finished Silica toner to the developing roller in a "q/m mono" electrometer/flow tester (EPPING GmbH, D-85375 Neufahrn) are measured.

TABLE 2-3

| | Toner charge [μC/g] | Flow behavior [mg] |
|---|---|---|
| Silica-free toner | −1.6 | 14 |
| Example 2.12 | −1.99 | 37 |

Example 2.13

Flow Behavior and Charge Behavior of Silica Toner 100 g of a Silica-free toner, compounded from 88 g of a binder resin (negatively charging, crushed solid resin type), based on polyester (cocondensate of phenyl-containing PPO and phthalic anhydride), having an average particle size of 10 μm, 8 g of a pigment-grade carbon black (Cabot Regal 400R), 2 g of a negatively controlling charge regulator (Aizen Spilon Black T-77, Hodogaya Chem.), and 2 g of a wax (Viscol TS-200, Sanyo Chem.) are admixed at room temperature for 1 hour to 1.5 g of a Silica according to Example 2.3 in a tumble mixer (e.g., Turbular). After a toner load time of 20 minutes (corresponding to the loading experienced after 1000 copying operations), the charging (charge per mass) of the finished Silica toner and the flow behavior (mass flow) of the finished Silica toner to the developing roller in a "q/m mono" electrometer/flow tester (EPPING GmbH, D-85375 Neufahrn) are measured.

TABLE 2-4

| | Toner charge [μC/g] | Flow behavior [mg] |
|---|---|---|
| Silica-free toner | −1.5 | 2 |
| Toner + Silica from Example 2.3 | −1.05 | 42 |

While embodiments of the invention have been illustrated and described, it is not intended that these embodiments illustrate and describe all possible forms of the invention.

Rather, the words used in the specification are words of description rather than limitation, and it is understood that various changes may be made without departing from the spirit and scope of the invention.

What is claimed is:

1. A continuous process for the preparation of a silylated silica having a low SiOH density, said process comprising separate successive steps of
    a) loading a parent hydrophilic silica with silylating agent at a first temperature to form a silylating agent-loaded silica;
    b) reacting said silylating agent and said silica of said silylating agent-loaded silica at a second temperature higher than said first temperature to form a silylated silica;
    c) purifying said silylated silica to remove unreacted silylating agent and/or reaction side products wherein said successive steps take place in separate but contiguous vessels or in a single vessel having separate loading, reaction, and purification zones, wherein silica is conveyed from one vessel to a subsequent continuous vessel or from one zone in a single vessel to a subsequent zone in said single vessel by gravity induced drop, a silylated silica product being continuously removed following said step of purifying.

2. A silylated silica having an SiOH density per $nm^2$ of silica surface area of less than 0.6 based on BET surface area measured in accordance with DIN 66131 and DIN 66132, said silylated silica prepared by the process of claim 1.

3. The silylated silica of claim 2, wherein said silylated silica has an average primary particle size of less than 100 nm, and contains larger aggregates as defined in DIN 53206 which have a diameter of from 100 to 1000 nm and agglomerates as defined in DIN 53206 having sizes of from 1 to 500 µm, the silica having a specific surface area of from 10 to 300 $m^2/g$ as measured by the BET methods of DIN 66131 and 66132, the silica having a fractal mass dimension $D_m$ of less than or equal to 2.8, and a surface silanol group density of less than 0.6 $SiOH/nm^2$, and a carbon content of at least 1.0% by weight per 100 $m^2/g$ specific surface area.

4. In a product of manufacture which is a toner, developer, charge control agent, flow aid for pulverulated systems, crosslinkable polymer composition or resin composition, wherein a silylated silica is employed, the improvement comprising adding to said product of manufacture the silica of claim 3.

5. The silylated silica of claim 2, having a homogeneously distributed fraction of polar groups in the silylating agent coat on the silica surface, having an average primary particle size of less than 100 nm, larger aggregates as defined in DIN 53206 which have a diameter of from 100 to 1000 nm, and agglomerates as defined in DIN 53206 which have sizes of from 1 to 500 µm, the silica having a specific surface area of from 10 to 300 $m^2/g$ measured by the BET method to DIN 66131 and 66132 a fractal mass dimension $D_m$ of less than or equal to 2.8, a surface silanol group (SiOH) density of less than 0.6 $SiOH/nm^2$, and a carbon content of at least 1.0% by weight per 100 $m^2/g$ specific surface area.

6. In a product of manufacture which is a toner, developer, charge control agent, flow aid for pulverulated systems, crosslinkable polymer composition or resin composition, wherein a silylated silica is employed, the improvement comprising adding to said product of manufacture the silica of claim 5.

7. In a product of manufacture which is a toner, developer, charge control agent, flow aid for pulverulent systems, crosslinkable polymer composition, or resin composition, wherein a silylated silica is employed, the improvement comprising adding to said product of manufacture the silica of claim 2.

8. In a product of manufacture which is a toner, developer, charge control agent, flow aid for pulverulated systems, crosslinkable polymer composition or resin composition, wherein a silylated silica is employed, the improvement comprising adding to said product of manufacture a silylated silica prepared by the process of claim 2.

9. The process of claim 1, wherein said parent hydrophilic silica is prepared under substantially anhydrous conditions.

10. The process of claim 1, wherein said reacting step takes place at a temperature at least 50° C. higher than said loading step.

11. The process of claim 1, wherein said purifying step includes supplying an inert gas to said silylated silica and withdrawing an inert gas mixture wherein unreacted silylating agent and/or reaction side products are entrained in said inert gas mixture.

12. The process of 11, wherein said inert gas mixture having entrained unreacted silylating agent and/or side products is recycled to said loading step.

13. The process of claim 1, wherein said loading step takes place in a first vessel or a first portion of a combined vessel, and said silylating agent-loaded silica is conveyed by gravity from said first vessel to a second vessel or from said first portion of a combined vessel to a second portion of said combined vessel isolated from said first portion.

14. The process of claim 1, wherein said unreacted silylating agent and/or reaction side products are recycled to said loading step.

15. The process of claim 1, wherein said silylating agent is contacted with said parent hydrophiic silica in liquid form as a finely divided aerosol.

16. The process of claim 1, wherein mechanical compaction or a method of deagglomeration or both are employed in at least one step of said process.

17. The process of claim 1, wherein said silylating agent comprises one or more silylating agents I) containing apolar groups selected from the group consisting of
    Ia) one or more organosilane(s) of the formula

$R^1{}_n SiX_{4-n}$ where n=1, 2 or 3
    or mixtures of these organosilanes,
    $R^1$ is a saturated or unsaturated, monovalent, optionally halogenated $C_{1-18}$ hydrocarbon radical,
    X is halogen, a nitrogen containing radical, $OR^2$, $OCOR^2$, or $O(CH_2)_x OR^2$, where
    $R^2$ is hydrogen or a monovalent $C_{1-12}$ hydrocarbon radical, and
    x=1,2 or 3, and/or
    Ib) one or more organosiloxane(s) containing at least two units of the formula(e)
        $(R^1{}_3 SiO_{1/2})$ and/or
        $(R^1{}_2 SiO_{2/2})$ and/or
        $(R^1 SiO_{3/2})$,
    $R^1$ being as defined above, and mixtures of Ia) and Ib).

18. The process of claim 17, wherein at least two different silylating agents are employed, wherein at least one silylating agent has a viscosity of less than 2 mPas at 25° C. and at least one silylating agent has a viscosity of more than 5 mPas at 25° C.

19. In a product of manufacture which is a toner, developer, charge control agent, flow aid for pulverulated systems, crosslinkable polymer composition or resin composition, wherein a silylated silica is employed, the improvement comprising adding to said product of manufacture a silylated silica prepared by the process of claim 18.

20. The process of claim 17, wherein said silylating agent further comprises one or more silylating agents II) containing polar groups, selected from the group consisting of:

IIa) one or more organosilane(s) of the formula $$R^3{}_mR^1{}_nSiX_1$$

where m+n+1=4,
n=0, 1 or 2,
and m=1, 2 or 3
where $R^3$ denotes hydrogen or a monovalent or divalent hydrocarbon radical containing one or more identical or different heteroatoms Y, and, if a divalent hydrocarbon radical, is optionally attached to 2 silicon atoms, or is optionally attached to an organosilane of structure $X_{4-n-m}R^1{}_nSiR^3{}_mSiR^1{}_nX_{4-n-m}$, the heteroatom Y being an element from main groups 3, 4 (excluding C), 5, and/or 6 of the periodic table of the elements, and/or an IIb) one or more organosiloxane(s) comprising at least two identical or different units of the formula $$R^3{}_qR^1{}_rSiO_{(4-q-r)/2},$$

where
q=1,2 or 3,
r=0, 1 or 2,
and q+r is <4,
and mixtures of IIa and IIb, with the proviso that silylating agents (II) containing polar groups comprise at least 1–80% by weight of the total amount of silylating agents (I) and (II).

21. In a product of manufacture which is a toner, developer, charge control agent, flow aid for pulverulated systems, crosslinkable polymer composition or resin composition, wherein a silylated silica is employed, the improvement comprising adding to said product of manufacture a silylated silica prepared by the process of claim 20.

22. The process of claim 20, wherein a silylating agent (I) containing apolar groups comprises minimally 20% by weight of total silylating agent.

23. In a product of manufacture which is a toner, developer, charge control agent, flow aid for pulverulated systems, crosslinkable polymer composition or resin composition, wherein a silylated silica is employed, the improvement comprising adding to said product of manufacture a silylated silica prepared by the process of claim 22.

24. In a product of manufacture which is a toner, developer, charge control agent, flow aid for pulverulated systems, crosslinkable polymer composition or resin composition, wherein a silylated silica is employed, the improvement comprising adding to said product of manufacture a silylated silica prepared by the process of claim 17.

25. The process of claim 1, wherein said silylating agent comprises one or more silylating agents, said silylating agents comprising silylating agents I), II) or mixtures thereof:

I) silylating agent(s) containing apolar groups
Ia) organosilane of the formula $$R^1{}_nSiX_{4-n}$$

where n=1,2 or 3
or mixtures of these organosilanes,
$R^1$ is a saturated or unsaturated, monovalent, optionally halogenated, $C_{1-8}$ hydrocarbon radical,
X is halogen, a nitrogen containing radical, $OR^2$, $OCOR^2$, $O(CH_2)_xOR^2$, where
$R^2$ is hydrogen or a monovalent $C_{1-2}$ hydrocarbon radical, and
x=1,2 or 3;

Ib) organosiloxane(s) composed of at least two units of the formula(e)
$(R^1{}_3SiO_{1/2})$ and/or
$(R^1{}_2SiO_{2/2})$ and/or
$(R^1SiO_{3/2})$,
$R^1$ being as defined above, and
and mixtures thereof;

II) silylating agent(s) containing polar groups
IIa) one or more organosilane(s) of the formula $$R^3{}_mR^1{}_nSiX_1$$

where m+n+1=4,
n=0, 1 or 2,
and m=1, 2 or 3
where $R^3$ denotes a hydrogen or a monovalent or divalent $C_{1-12}$ hydrocarbon radical containing one or more identical or different heteroatoms Y, and, if a divalent hydrocarbon radical, optionally attached to 2 silicon atoms, or to an organosilane of structure $X_{4-n-m}R^1{}_nSiR^3{}_mSiR^1{}_nX_{4-n-m}$,
the heteroatom Y being an element from main groups 3, 4 (excluding C), 5, and 6 of the periodic table of the elements, IIb) one or more organosiloxane(s) comprising at least two identical or different units of the formula $$R^3{}_qR^1{}_rSiO_{(4-q-r)/2},$$

where
q=1,2 or 3,
r=0, 1 or 2,
and q+r is <4,
and mixtures of IIa and IIb.

26. In a product of manufacture which is a toner, developer, charge control agent, flow aid for pulverulated systems, crosslinkable polymer composition or resin composition, wherein a silylated silica is employed, the improvement comprising, adding to said product of manufacture a silylated silica prepared by the process of claim 25.

27. In a product of manufacture which is a toner, developer, charge control agent, flow aid for pulverulated systems, crosslinkable polymer composition or resin composition, wherein a silylated silica is employed, the improvement comprising adding to said product of manufacture a silylated silica prepared by the process of claim 1.

* * * * *

UNITED STATES PATENT AND TRADEMARK OFFICE
CERTIFICATE OF CORRECTION

PATENT NO.    : 6,800,413 B2
DATED         : October 5, 2004
INVENTOR(S)   : Herbert Barthel et al.

It is certified that error appears in the above-identified patent and that said Letters Patent is hereby corrected as shown below:

Column 34,
Line 13, delete "$C_{1-2}$" and insert therefor -- $C_{1-12}$ --.

Signed and Sealed this

Eighth Day of February, 2005

JON W. DUDAS
*Director of the United States Patent and Trademark Office*